(12) United States Patent
Tsuruta

(10) Patent No.: US 7,152,206 B1
(45) Date of Patent: Dec. 19, 2006

(54) PRINTED MATTER PRODUCING METHOD, PRINTED MATTER PRODUCING APPARATUS UTILIZING SAID METHOD, AND COMPUTER-READABLE RECORDING MEDIUM

(75) Inventor: Kiyofumi Tsuruta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 654 days.

(21) Appl. No.: 09/584,966

(22) Filed: Jun. 2, 2000

(30) Foreign Application Priority Data

Jun. 3, 1999 (JP) .................................. 11-156824

(51) Int. Cl.
*G06F 17/00* (2006.01)

(52) U.S. Cl. .................. 715/526; 715/517; 235/462.01

(58) Field of Classification Search ................ 715/506, 715/526, 520, 517; 380/51, 54; 709/218; 235/462.01, 456, 454, 494; 382/232
See application file for complete search history.

(56) References Cited

U.S. PATENT DOCUMENTS

| | | | | | |
|---|---|---|---|---|---|
| 4,692,603 | A | * | 9/1987 | Brass et al. .................. | 235/454 |
| 4,728,783 | A | * | 3/1988 | Brass et al. .................. | 235/456 |
| 4,754,127 | A | * | 6/1988 | Brass et al. .................. | 235/456 |
| 4,782,221 | A | * | 11/1988 | Brass et al. .................. | 235/494 |
| 5,214,755 | A | * | 5/1993 | Mason ........................ | 715/520 |
| 5,337,362 | A | * | 8/1994 | Gormish et al. .............. | 380/54 |
| 5,475,805 | A | * | 12/1995 | Murata ........................ | 715/513 |
| 5,486,686 | A | * | 1/1996 | Zdybel et al. ............... | 235/375 |
| 5,649,186 | A | * | 7/1997 | Ferguson ..................... | 707/10 |
| 5,682,540 | A | * | 10/1997 | Klotz et al. ................. | 715/505 |
| 5,694,609 | A | * | 12/1997 | Murata ........................ | 715/513 |
| 5,703,795 | A | * | 12/1997 | Mankovitz .................. | 715/721 |
| 5,761,686 | A | * | 6/1998 | Bloomberg ................. | 715/529 |
| 5,938,727 | A | * | 8/1999 | Ikeda .......................... | 709/218 |
| 6,052,514 | A | * | 4/2000 | Gill et al. .................... | 715/733 |
| 6,279,013 | B1 | * | 8/2001 | LaMarca et al. ............. | 715/500 |
| 6,486,898 | B1 | * | 11/2002 | Martino et al. .............. | 715/853 |
| 6,826,727 | B1 | * | 11/2004 | Mohr et al. ................. | 715/517 |
| 6,853,950 | B1 | * | 2/2005 | O'Reilly et al. ............. | 702/179 |
| 2002/0078096 | A1 | * | 6/2002 | Milton ........................ | 707/517 |
| 2002/0188635 | A1 | * | 12/2002 | Larson ........................ | 707/515 |

OTHER PUBLICATIONS

R. Adams, "BarCode 1," Feb. 2, 1998, downloaded from http://www.adams1.com/pub/russadam/stack.html background on bar codes.*

(Continued)

*Primary Examiner*—William Bashore
*Assistant Examiner*—James H Blackwell
(74) *Attorney, Agent, or Firm*—Staas & Halsey LLP

(57) ABSTRACT

The present invention aims to provide a method of producing printed matter containing various types of materials which are easy to understand and make a great impression on readers. In accordance with this method of the present invention, a direct-reading material and a related material including text, sound, and images are printed on a page in a newspaper. The additional material are printed in the form of codes for high-density display, and can be read by a pen-type scanner. The read additional material is restored by decoding software. A material which is not allocated in the newspaper is stored in an information center, and the storage address is placed in the form of a code on the newspaper. The points of the contents of the non-allocated material are also placed in the newspaper. If a reader wish to know the details of the non-allocated material, he or she should scan the storage address with the pen-type scanner.

10 Claims, 22 Drawing Sheets

OTHER PUBLICATIONS

R. Adams, "BarCode 1, 2-dimensional bar Code Page", web page as of Jan. 28, 1999, downloaded from http://web.archive.org/web/19990128002119/http://www.adams1.com/pub/russadam/stack.html.*

J. Leonard, "The Oldskool PC Carnival Sideshow", 1984-2004, downloaded from http://www.oldskool.org/shrines/carny used for background only.*

* cited by examiner

FIG.9

| MATERIAL ID | FILE NAME | GUIDE COMMENT (1) | FILE NAME (2) | . . | GUIDE COMMENT (n) | TOTAL SPACE |
|---|---|---|---|---|---|---|
| ARTICLE 1 | 131.COD | DETAILS OF THE O△ ARTICLE | | | | 30 |
| AD 1 | 118.COD | FOR LISTENING, SCAN ⇨ | 146.COD | | | 150 |
| . . | | | | | | |
| ARTICLE 5 | 128.COD | FOR DYNAMIC IMAGES, SCAN HERE | | | | 30 |

23

ITEMS ON ADDITIONAL MATERIALS

41: TYPE SPACE OF THE DIRECT-
   READING MATERIAL (SEE FIG. 6)
42: TYPE SPACE OF THE GUIDE COMMENTS
   ON THE ADDITIONAL MATERIAL
43: TYPE SPACE OF THE CODE PORTION OF
   THE ADDITIONAL MATERIAL (SEE FIG. 7)
44: THE ENTIRE TYPE SPACE OF THE ADDITIONAL
   MATERIAL
45: THE TOTAL TYPE SPACE OF THE DIRECT-READING
   MATERIAL AND THE ADDITIONAL MATERIAL
   (SEE FIG. 9)

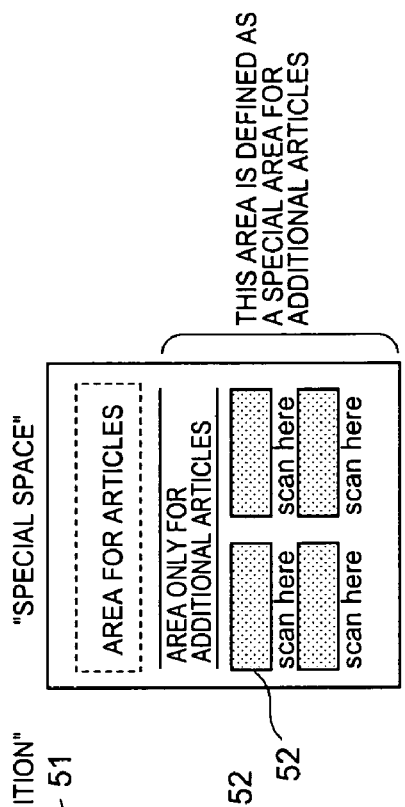
FIG.11A
"IMMEDIATE ALLOCATION POSITION"
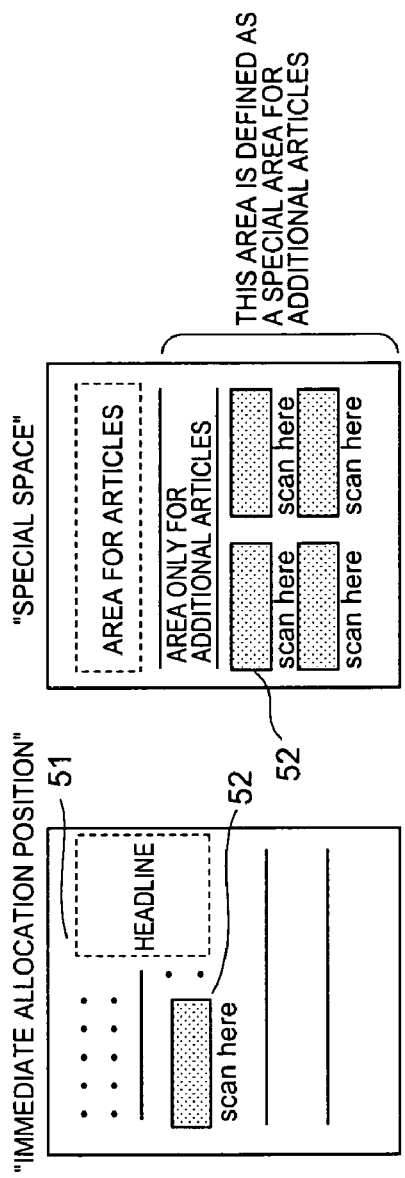
FIG.11B
"SPECIAL SPACE"
FIG.11C
DIRECTLY DESIGNATED VACANT POSITION
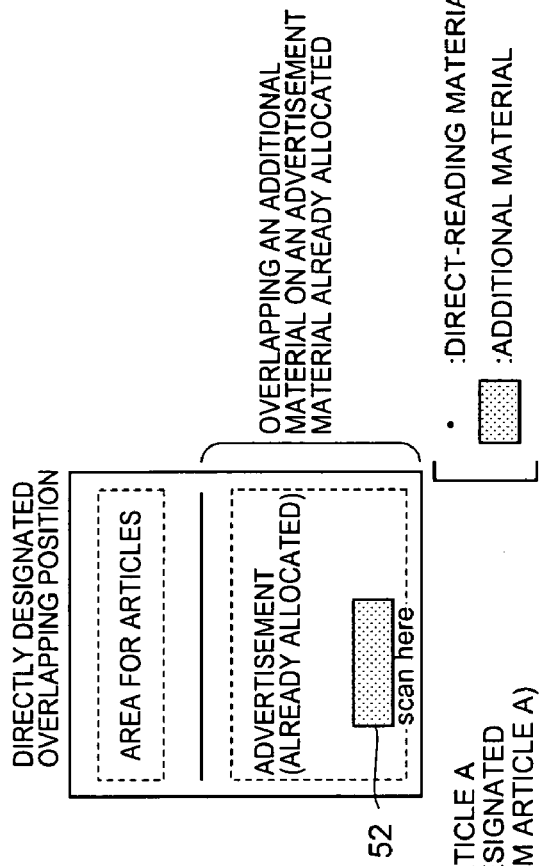
FIG.11D
DIRECTLY DESIGNATED OVERLAPPING POSITION
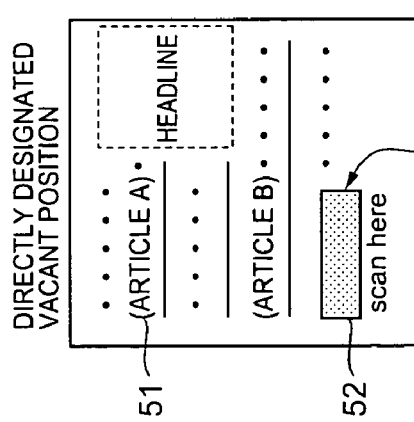

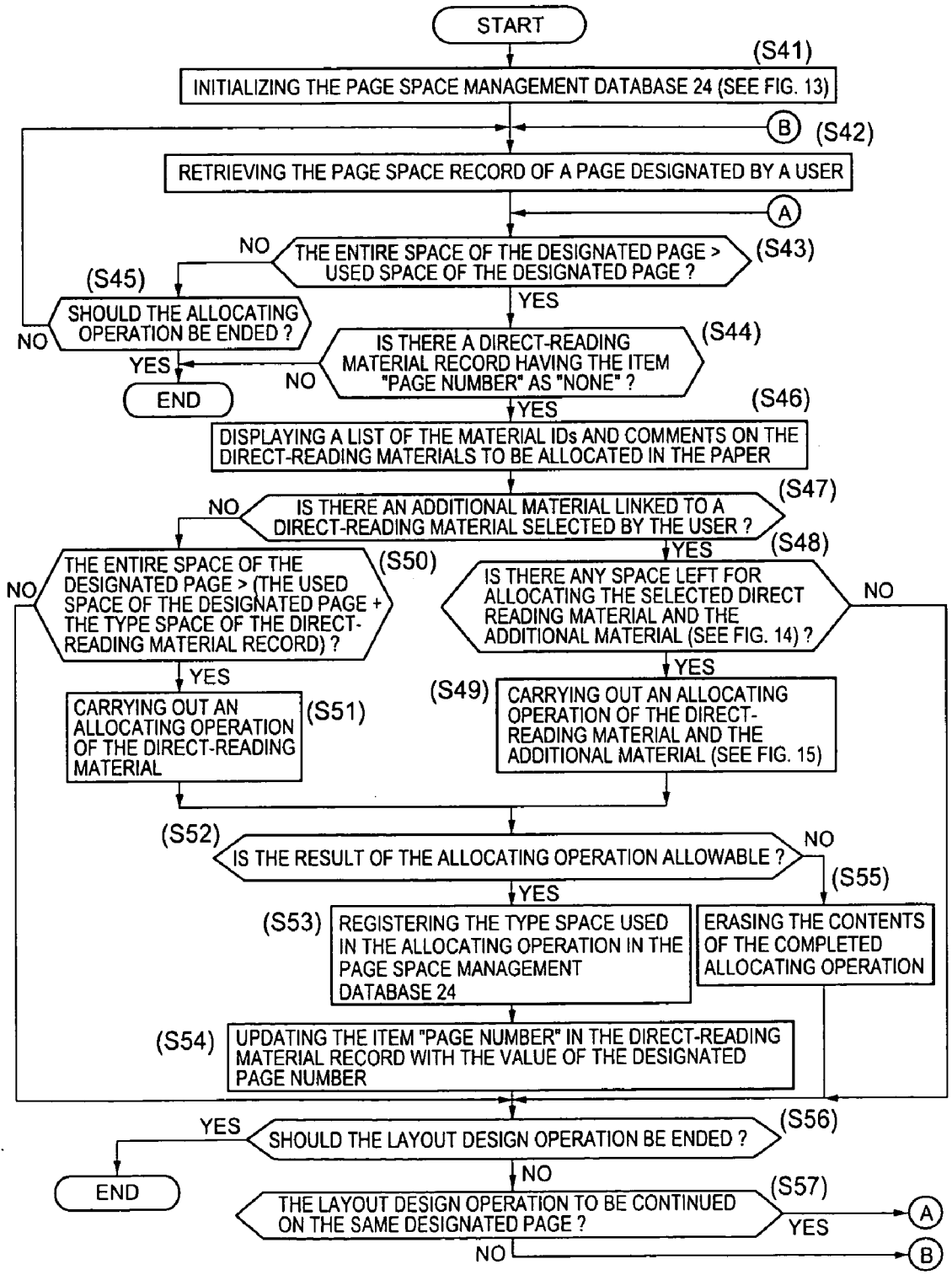

FIG.13

| PAGE | TOTAL SPACE | EXISTENCE OF A SPECIAL SPACE FOR ADDITIONAL MATERIALS | THE ENTIRE SPECIAL SPACE FOR ADDITIONAL MATERIALS | THE TOTAL USED SPECIAL SPACE FOR ADDITIONAL MATERIALS | THE TOTAL USED SPACE ON THE PAGE | ADDITIONAL MATERIAL ALLOCATED POSITION |
|---|---|---|---|---|---|---|
| 1 | 300 | NONE | 0 | 0 | 0 | IMMEDIATE ALLOCATION POSITION |
| 2 | 300 | EXISTING | 200 | 0 | 200 | SPECIAL SPACE |
| .. | .. | .. | .. | .. | .. | .. |
| 32 | 300 | NONE | 0 | 0 | 0 | IMMEDIATE ALLOCATION POSITION |

FIG. 14

(A) WHEN THE ALLOCATED POSITION OF AN ADDITIONAL MATERIAL IS THE "IMMEDIATE ALLOCATION POSITION", OR
(C) WHEN THE ALLOCATED POSITION IS THE "DIRECTLY DESIGNATED VACANT POSITION",
   THE ENTIRE SPACE OF THE DESIGNATED PAGE >
   (THE ENTIRE USED SPACE + THE TOTAL TYPE SPACE 45 OF THE DIRECT-READING MATERIAL AND THE ADDITIONAL MATERIAL TO BE ALLOCATED)

(B) WHEN THE ALLOCATED POSITION IS IN THE "SPECIAL SPACE",
   (a) THE ENTIRE SPACE OF THE DESIGNATED PAGE >
      (THE ENTIRE USED SPACE + THE TYPE SPACE 41 OF THE DIRECT-READING MATERIAL TO BE ALLOCATED), AND
   (b) THE ENTIRE SPECIAL SPACE FOR ADDITIONAL MATERIALS >
      [THE ENTIRE USED SPECIAL SPACE FOR ADDITIONAL MATERIALS + THE TYPE SPACE OF THE ADDITIONAL MATERIAL TO BE ALLOCATED (= THE TOTAL TYPE SPACE 45 OF THE LINKING MANAGEMENT DATABASE - THE TYPE SPACE 41 OF THE DIRECT-READING MATERIAL TO BE ALLOCATED)]

(D) WHEN THE ALLOCATED POSITION IS THE "DIRECTLY DESIGNATED OVERLAPPING POSITION",
   THE ENTIRE SPACE OF THE DESIGNATED PAGE >
   (THE ENTIRE USED SPACE + THE TYPE SPACE 41 OF THE DIRECT-READING MATERIAL TO BE ALLOCATED)

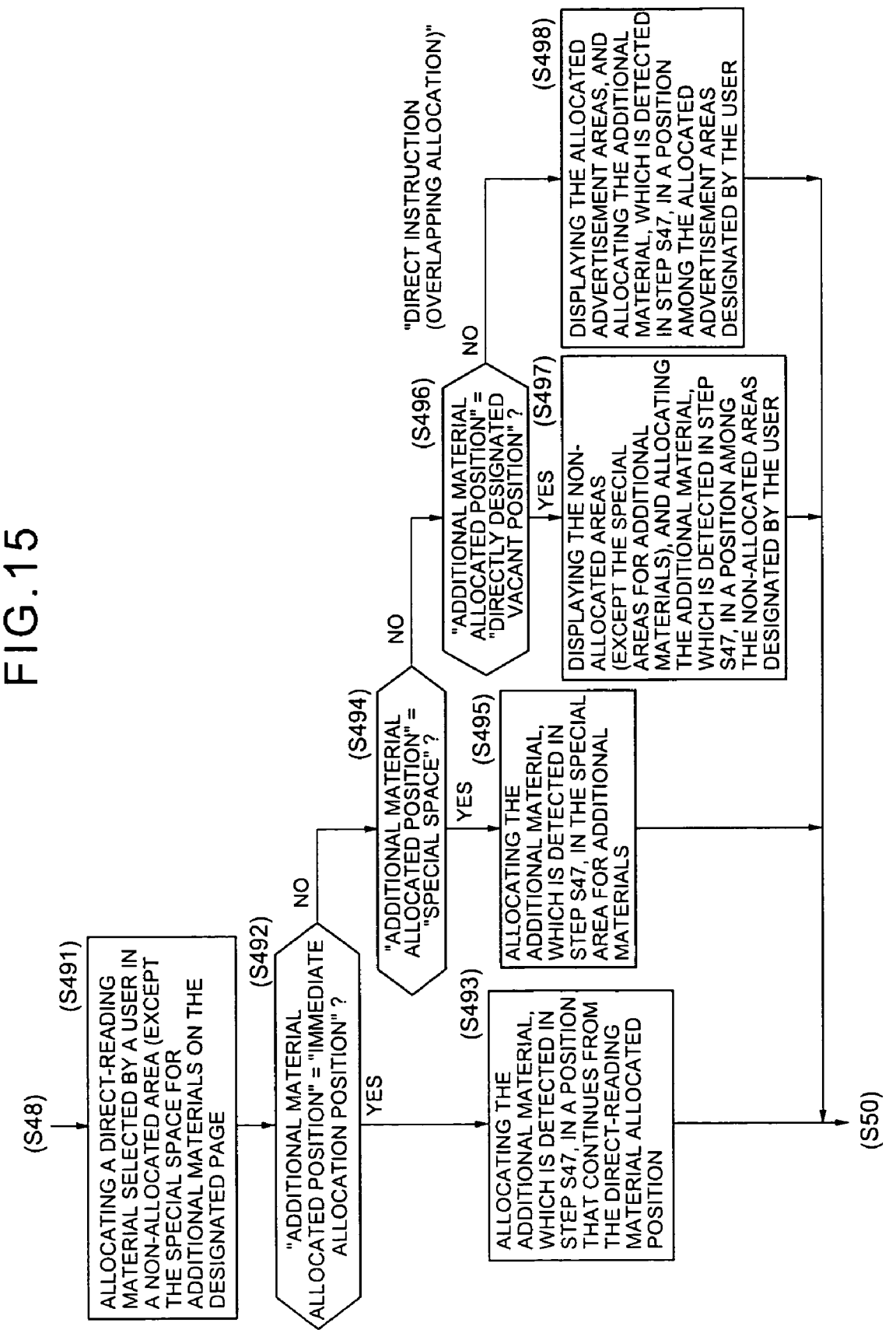

FIG.19

MATERIAL SELECTING DISPLAY

LAYOUT PAGE No.31    GENERAL NEWS PAGE
MATERIAL SELECTING CONDITIONS

MATERIAL TYPE    OALL    OPHOTO    OARTICLE    OAD

WRITER    [ ALL ▼ ]

UPDATED DATE    HR. MIN. DATE. ~ HR. MIN. DATE.

TYPE SPACE

MATERIAL ID [      ]

SELECTED MATERIAL (SEARCH RESULT)

| MATERIAL ID | COMMENTS ON MATERIAL | WRITER | UPDATED DATE | TYPE SPACE |
|---|---|---|---|---|
|  |  |  |  |  |
|  |  |  |  |  |

FIG.21

NON-ALLOCATED MATERIAL SELECTING DISPLAY

MATERIAL SELECTING CONDITIONS

MATERIAL TYPE    ○ALL    ○PHOTO    ○ARTICLE    ○AD

WRITER    [ ALL ▼ ]

UPDATED DATE    HR. MIN. DATE. ~ HR. MIN. DATE.

TYPE SPACE

MATERIAL ID    [　　　　]

SELECTED MATERIAL (SEARCH RESULT)

| MATERIAL ID | COMMENTS ON MATERIAL | WRITER | UPDATED DATE | TYPE SPACE |
|---|---|---|---|---|
| | | | | |
| | | | | |

PRINTED MATTER PRODUCING METHOD, PRINTED MATTER PRODUCING APPARATUS UTILIZING SAID METHOD, AND COMPUTER-READABLE RECORDING MEDIUM

BACKGROUND OF THE INVENTION

1. Field of the Invention

The present invention generally relates to methods of producing printed matter such as newspapers and magazines. More particularly, the present invention relates to a method of producing printed matter containing direct-reading materials including text and pictures, and related materials including text, sound, and images, using an information processing apparatus. Furthermore, the present invention relates to a method of producing printed matter containing the points of materials to which space on a newspaper or a magazine are not allocated, and positional information of an area in which the non-allocated materials are stored in advance.

2. Description of the Related Art

Printer matter normally contains direct-reading materials such as text and photographs in articles and advertisement, but does not include audio or dynamic visual information.

In a case of a newspaper, for instance, the total number of pages is predetermined, and the amount of information placed in the newspaper is limited accordingly. As a result, many articles are killed during the editing.

Because of the characteristics of printed matter, a printing method in which a part of the print is made unreadable, but can be read by a special device, has not been employed.

The conventional printed matter has the following problems:

(1) Since the audio and dynamic visual information related to a direct-reading material is not included, there is a limit to information transmission to readers. Compared with a television medium, an advertisement has a smaller impact on readers, and a news report lacks a sense of reality.

(2) In a case of newspapers having a large circulation and a limited type space, there are always articles which are not printed. The contents of such newspapers often become dull and monotonous.

(3) For those who have difficulty in reading small letters, the conventional printed matter does sufficiently serve as an information transmitter.

(4) Materials that can be accessed only by special members holding a password cannot be allocated in the conventional printed matter.

To solve these problems, an additional material including text, sound, and images related to a direct-reading material, should be converted into secondary data in the form of codes for high-density display. This secondary data is then printed on a page in a newspaper. Also, the points of the contents of a non-allocated material and the positional information of the storage area that stores the non-allocated materials should be printed on the newspaper. Furthermore, a part of the newspaper can be made directly unreadable, so that only the member of some special group have access to the contents of that part of the newspaper through a password, for instance.

SUMMARY OF THE INVENTION

A general object of the present invention is to provide methods of producing printed matter such as newspapers and magazines in which the above disadvantages are eliminated.

A more specific object of the present invention is to provide a method of producing printed matter containing various types of materials, the contents of which have a larger impact on readers and maintains a sense of reality. In this method, the producing side is rarely required to kill the materials.

The above objects of the present invention are achieved by a method of producing printed matter containing a direct-reading material and an additional material related to the direct-reading material by an information processing apparatus, the direct-reading material including text and pictures, the additional material including text, sound, and images related to the direct-reading material. This method comprises the steps of:

converting primary data of the additional material into secondary data in the form of codes for high-density display;

performing an allocating operation for the direct-reading material and the additional material in accordance with a type space corresponding to the secondary data.

In this method, the allocating operation performing step may include the step of linking the direct-reading material designated by a user and the related additional material.

The above objects of the present invention are also achieved by a method of producing printed matter containing various materials by an information processing apparatus. This method comprises the steps of:

converting points of a non-allocated material designated by a user into directly readable printing data;

converting positional information of an area in which the non-allocated material is separately stored into printing data that can be read by a reading device; and allocating the points of the non-allocated material and the positional information.

The above objects of the present invention are also achieved by the use of an apparatus that produces printed matter on which a direct-reading material including text and pictures, and a related additional material including text, sound, and images, are printed. This apparatus comprises:

an encoding mechanism that converts primary data of the additional material into secondary data in the form of codes for high-density display; and a layout design mechanism that carries out an allocating operation for the direct-reading material and an allocating operation for the additional material in accordance with a type space corresponding to the secondary data.

This apparatus may further comprise a linking mechanism that links the direct-reading material designated by a user and the related additional material.

The above objects of the present invention are also achieved by the use of an apparatus that produces printed matter containing various types of information, comprising:

an information creating mechanism that converts points of a non-allocated material designated by a user into directly readable printing data, and also converts positional information of an area in which the non-allocated material is separated stored into printing data that can be read by a reading device; and a layout design mechanism that carries out an allocating operation for the points of the non-allocated material and the positional information.

In accordance with the present invention, direct-reading materials and related additional materials for high-density display are placed on pages. The additional materials are not directly readable, but can be read by a pen-type scanner, for instance.

In compliance with an instruction from a user, the direct-reading materials are linked to the additional materials.

If there is a non-allocated material, the point of the contents of the non-allocated material and the positional information of the storage area that stores the non-allocated material are printed on a page. The points of the contents are directly readable, but the positional information cannot be directly read.

If a user wish to know the contents of the non-allocated material after reading the points of the contents, he or she should scan the positional information with a pen-type scanner, for instance.

The present invention also aims to provide a computer-readable recording medium that stores a program having functions of enabling a computer to produce printed matter which has the same effects as the above method and apparatus.

The above and other objects and features of the present invention will become more apparent from the following description taken in conjunction with the accompanying drawings.

BRIEF DESCRIPTION OF THE DRAWINGS

FIG. 9 shows the structure of a linking management database;

FIGS. 11A to 11D illustrate example positions of allocated additional materials in accordance with the present invention;

FIG. 12 is a flowchart of an operation of the layout design mechanism in accordance with the present invention;

FIG. 13 shows an example of the initial setting of the page space management database;

FIG. 14 is a table of criteria used in step S48 in the flowchart of FIG. 12;

FIG. 15 is a flowchart of step S49 in the flowchart of FIG. 12;

FIG. 19 shows the initial state of a material selecting display;

FIG. 21 shows the initial state of a non-allocated material selecting display.

DESCRIPTION OF THE PREFERRED EMBODIMENTS

The following is a description of embodiments of the present invention, with reference to the accompanying drawings. In the embodiments of the present invention, a newspaper is employed as a printing matter to be produced, for ease of explanation.

Figure 1:
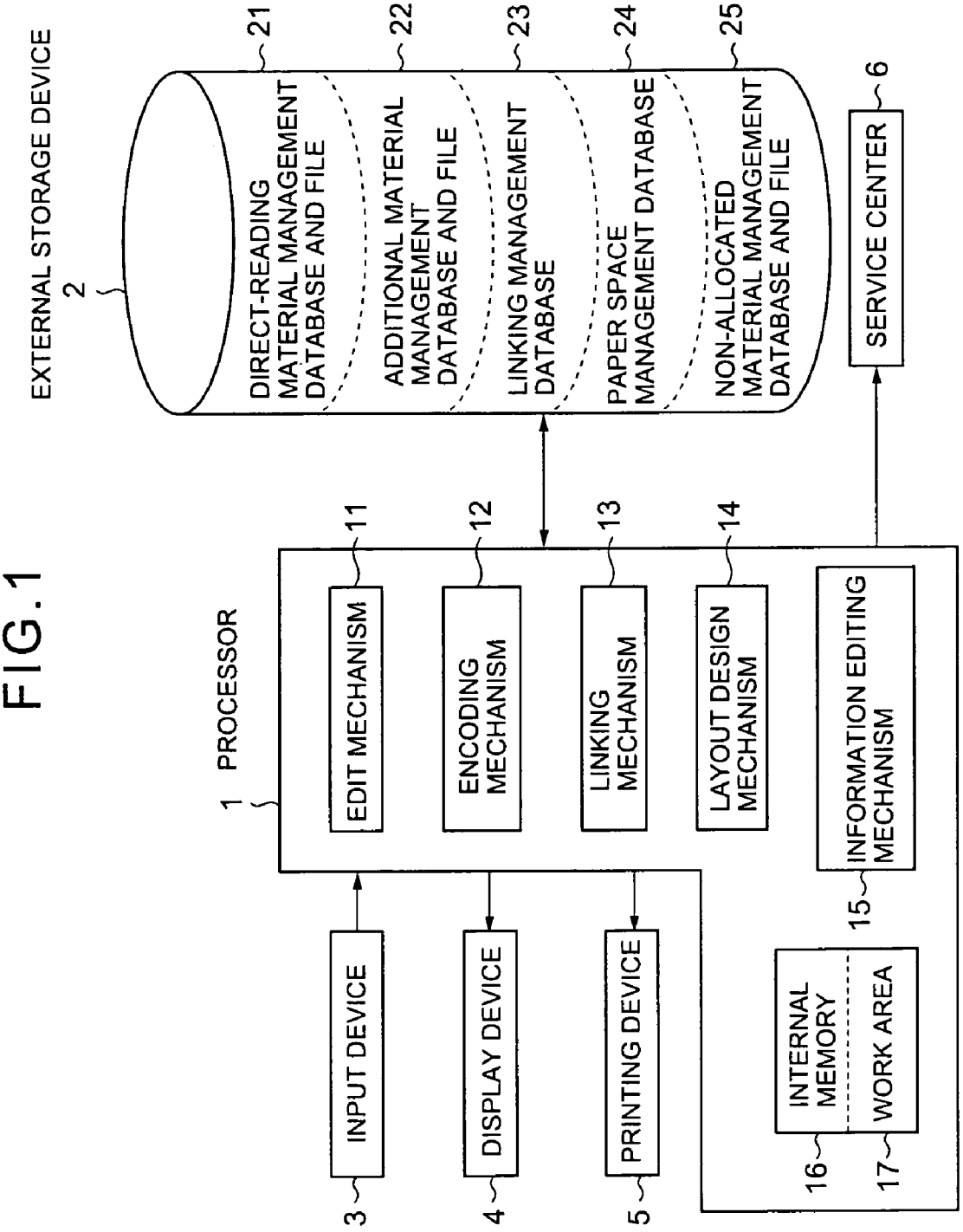
FIG. 1 shows the entire structure of a printing matter producing system of the present invention.

FIG. 1 illustrates the entire structure of a printing matter producing system of the present invention. In FIG. 1, reference numeral 1 indicates a processor that edits direct-reading materials, encodes additional materials, performs a linking process on the direct-reading materials and the additional materials, allocates the direct-reading materials and the additional materials onto papers, and creates information for non-allocated materials. Reference numeral 11 indicates an edit mechanism that comprises an editor program for the direct-reading materials. Reference numeral 12 indicates an encoding mechanism that includes an encoding program for the additional materials. Reference numeral 13 indicates a linking mechanism that includes a linking program for the direct-reading materials and the additional materials. Reference numeral 14 indicates a layout design mechanism that includes an allocating program for the direct-reading materials and the additional materials. Reference numeral 15 indicates an information creating mechanism that includes an information creating program for the non-allocated materials. Reference numeral 16 indicates an internal memory. Reference numeral 17 indicates a work area. Reference numeral 2 indicates an external storage device. Reference numeral 21 indicates a direct-reading material management database and a direct-reading material file (also shown in FIG. 6). Reference numeral 22 indicates an additional material management database and an additional material file (also shown in FIG. 7). Reference numeral 23 indicates a link management database (also shown in FIG. 9). Reference numeral 24 indicates a paper space management database (also shown in FIG. 13). Reference numeral 25 indicates a non-allocated material management database and a non-allocated material file (also shown in FIG. 18). Reference numeral 3 indicates an input device that receives material data used in the above various processes and instructions from data users, and transfers the material data and the instructions to the processor 1. Reference numeral 4 indicates a display device that displays guidance for users, and displays the content of inputs from users or the results of a process performed by the processor 1. Reference numeral 5 indicates a printing device that prints the direct-reading materials and the additional materials. Reference numeral 6 indicates a service center that holds the detailed contents of non-allocated materials, only the points of which are placed in the newspaper.

Figure 2:
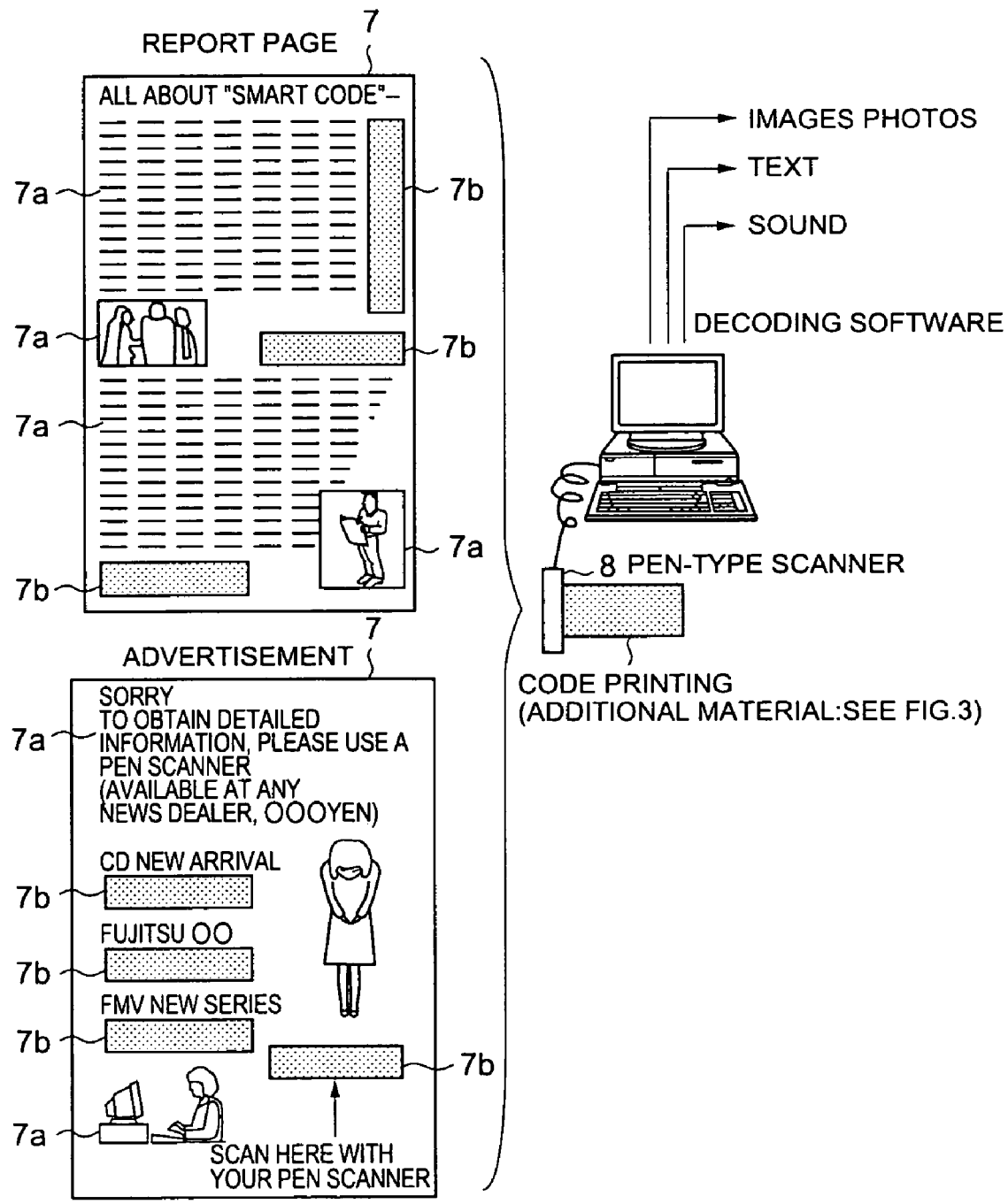
FIG. 2 is a schematic view of a newspaper on which direct-reading materials and additional materials are placed.

FIG. 2 illustrates a paper on which direct-reading materials and additional materials are actually put. In this figure, reference numeral 7 indicates a page of a newspaper. Reference numeral 7a indicates portions on which the direct-reading materials are printed. Reference numeral 7b indicates portions on which coded additional materials are printed. Reference numeral 8 indicates a pen-type scanner. For the convenience of drafting the drawing, the coded additional material printed portions 7b are shaded, but the detailed contents of the printed portions 7b are as shown in FIG. 3.

The coded additional material printed portions 7b are read by the pen-type scanner 8, and are subjected to decoder software. As a result, the contents of the coded additional materials are outputted in the form of pictures, photographs, text, and sound.

The coded additional material printed portion 7b may be allowed only to special members who possess a special password. The contents of the coded additional material printed portions 7b may be completely independent of the contents of the direct-reading materials, and may be read out individually.

Figure 3:
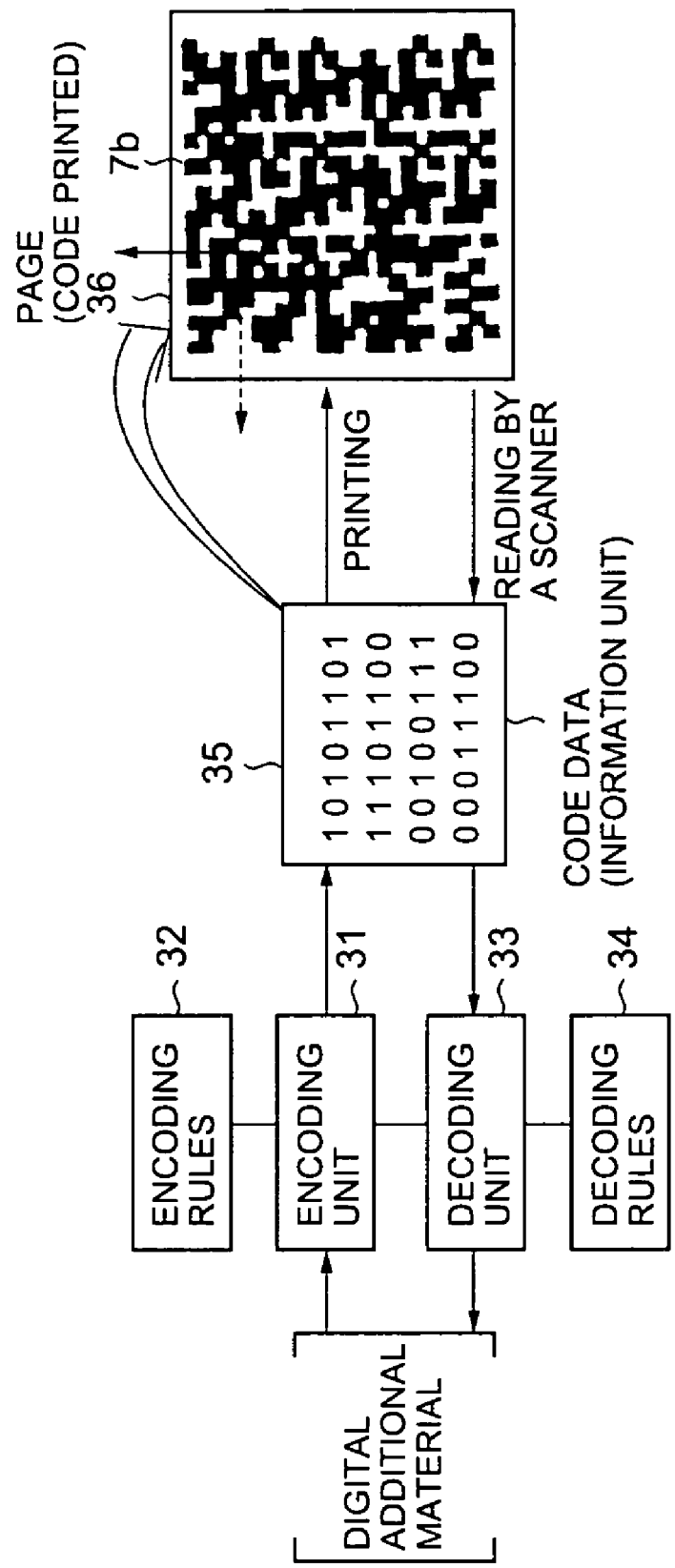
FIG. 3 shows a printing system of additional materials onto a paper and a reading system of the additional materials from the newspaper.

FIG. 3 illustrates a printing system of the additional materials onto the paper and a reading system of the additional material from the paper. In this figure, reference numeral 7b indicates the coded additional material printed portions. Reference numeral 31 indicates an encoding unit. Reference numeral 32 indicates encoding rules. Reference numeral 33 indicates a decoding unit. Reference numeral 34 indicates decoding rules. Reference numeral 35 indicates code data (an information unit). Reference numeral 36 indicates the upper left portion of one of the coded additional material printed portions 7b.

The encoding and decoding technique used in this embodiment is suitable for high-density display, and the details of this technique is disclosed in Japanese Laid-Open Patent Application No. 6-343132. The additional material data is compressed prior to the encoding process, so that high-density printing can be carried out.

The primary data of the additional materials is converted into the 4-byte code data 35 (secondary data) by the encoding unit 31 in conformity with the encoding rules 32. The code data 35 shown in FIG. 3 represents the character "C". The "1" bits in the code data 35 correspond to black, and the "0" bits correspond to white.

The coded additional material printed portions 7b shown in FIG. 3 are the printed result of 18 sets of code data. The code data 35 is printed in the upper left portion 36 of the coded additional material printed portion 7b, that is, in one eighteenth of the entire area of the coded additional material printed portion 7b.

The upper left portion 36 of the coded additional material printed portion 7b is read by a scanner to obtain the 4-byte code data 35. This code data 35 is then processed by the decoding unit 33 in conformity with the decoding rules 34, so as to restore the original additional material.

Figure 4:
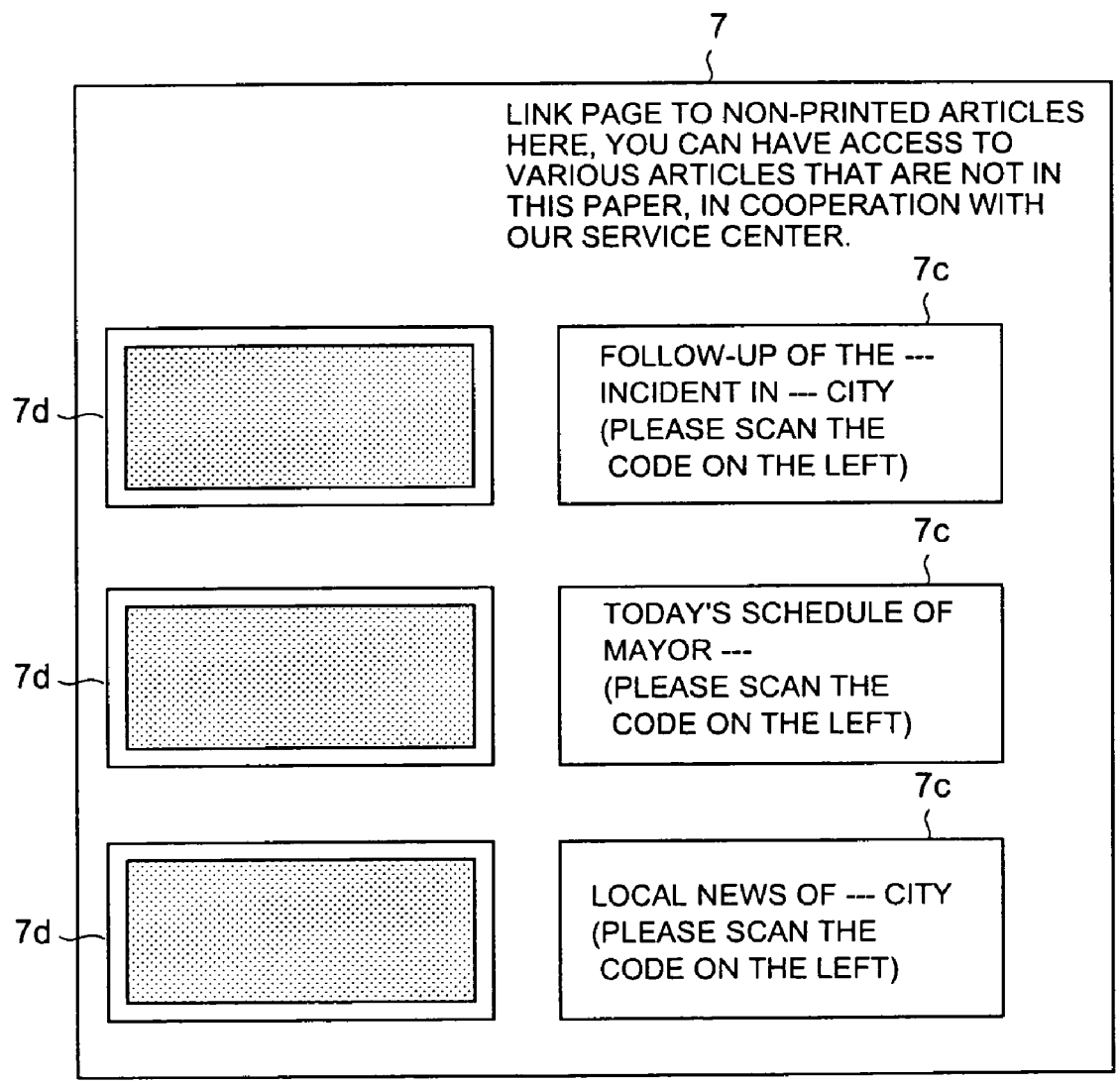
FIG. 4 is a schematic view of a page which shows information of non-allocated materials.

FIG. 4 is a schematic view of a paper that shows information of non-allocated materials. In this figure, reference numeral 7 indicates a newspaper, reference numeral 7c indicates the portions on which the points of the non-allocated materials are printed, and reference numeral 7d indicates code printed portions of storage addresses (positional information) of the service center 6 that stores the non-allocated materials. The code printed portions 7d may be constituted by two-dimensional bar codes.

When a reader wishes to know the contents of the materials introduced in the printed portions 7c, that is, when a reader wishes to obtain the contents of the materials stored in the service center 6, all he or she needs to do is to scan the code printed portions 7d with the pen-type scanner 8.

The storage addresses of the respective code printed portions 7d are decoded by a material retrieval mechanism (not shown), and the material data is retrieved from the storage address area in the service center 6. The retrieved material data is then displayed on a screen.

Figure 5:
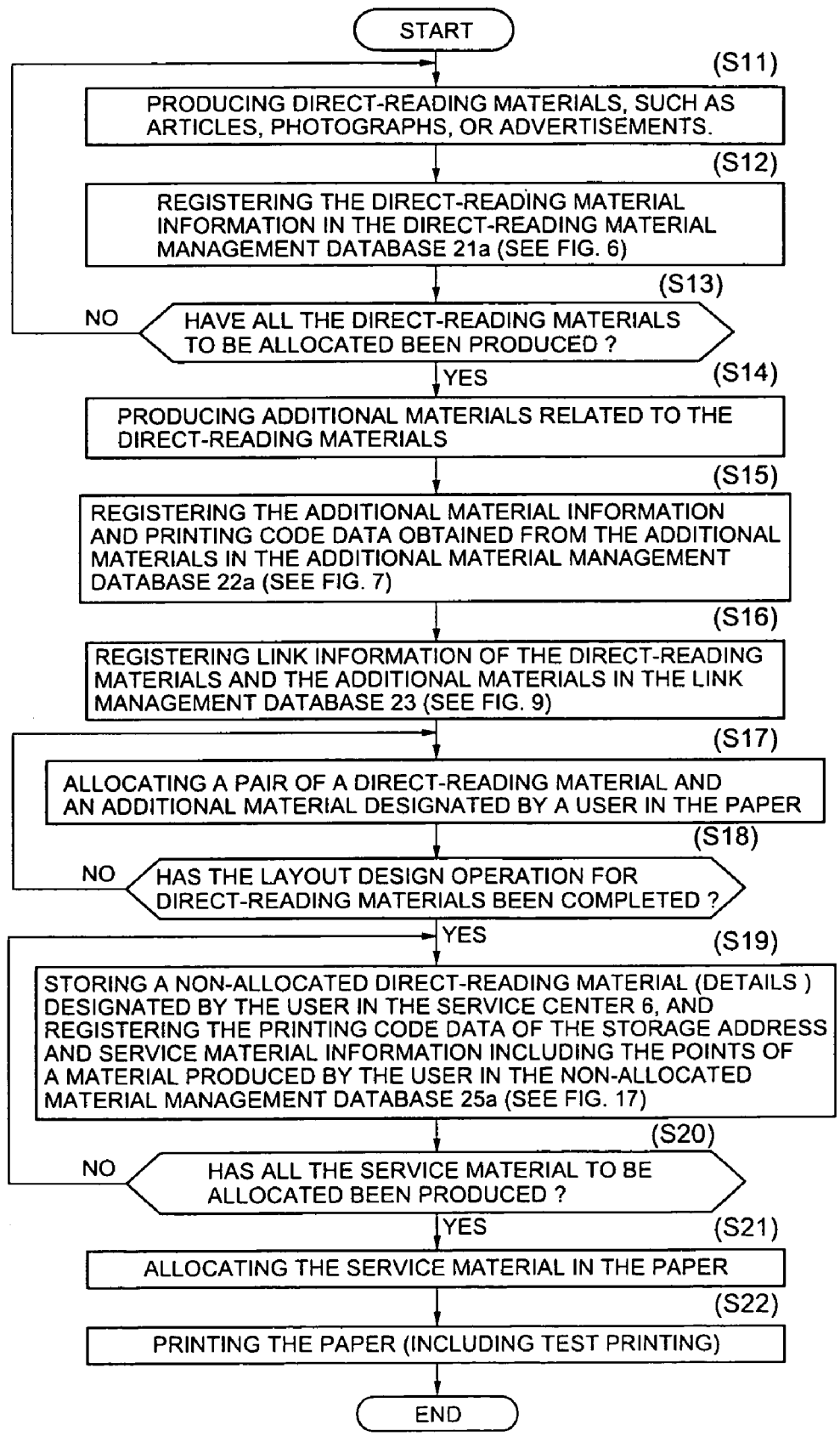
FIG. 5 is a flowchart of an operation of newspaper production in accordance with the present invention.

FIG. 5 shows the entire procedure of newspaper production, the details of which are as follows.

In step S11, direct-reading materials, such as text, photographs, and advertisements, are produced by the edit mechanism 11. After that, the operation moves on to the next step.

In step S12, the edit mechanism 11 stores the information of the produced direct-reading materials in a direct-reading material management database 21a (shown in FIG. 6), and the operation moves on to the next step. Prior to this storage, the type space required for printing the direct-reading material should be specified in advance.

In step S13, it is determined whether or not all the direct-reading materials to be laid out have been produced, i.e., whether or not an instruction to stop the production has been issued. If it is determined that all the direct-reading materials to be laid out have been produced, the operation moves on to the next step. If it is determined that not all the direct-reading materials to be laid out have been completed, the operation returns to step S11.

In step S14, additional materials (information including text, sound, and images employed for easier understanding of the direct-reading materials) are produced. The operation then moves on to the next step. In this production of the additional materials, the use of the edit mechanism 11 is left to a user's discretion. Where the edit mechanism 11 is not used, an external tool is employed for the production of the additional materials.

Figure 7:
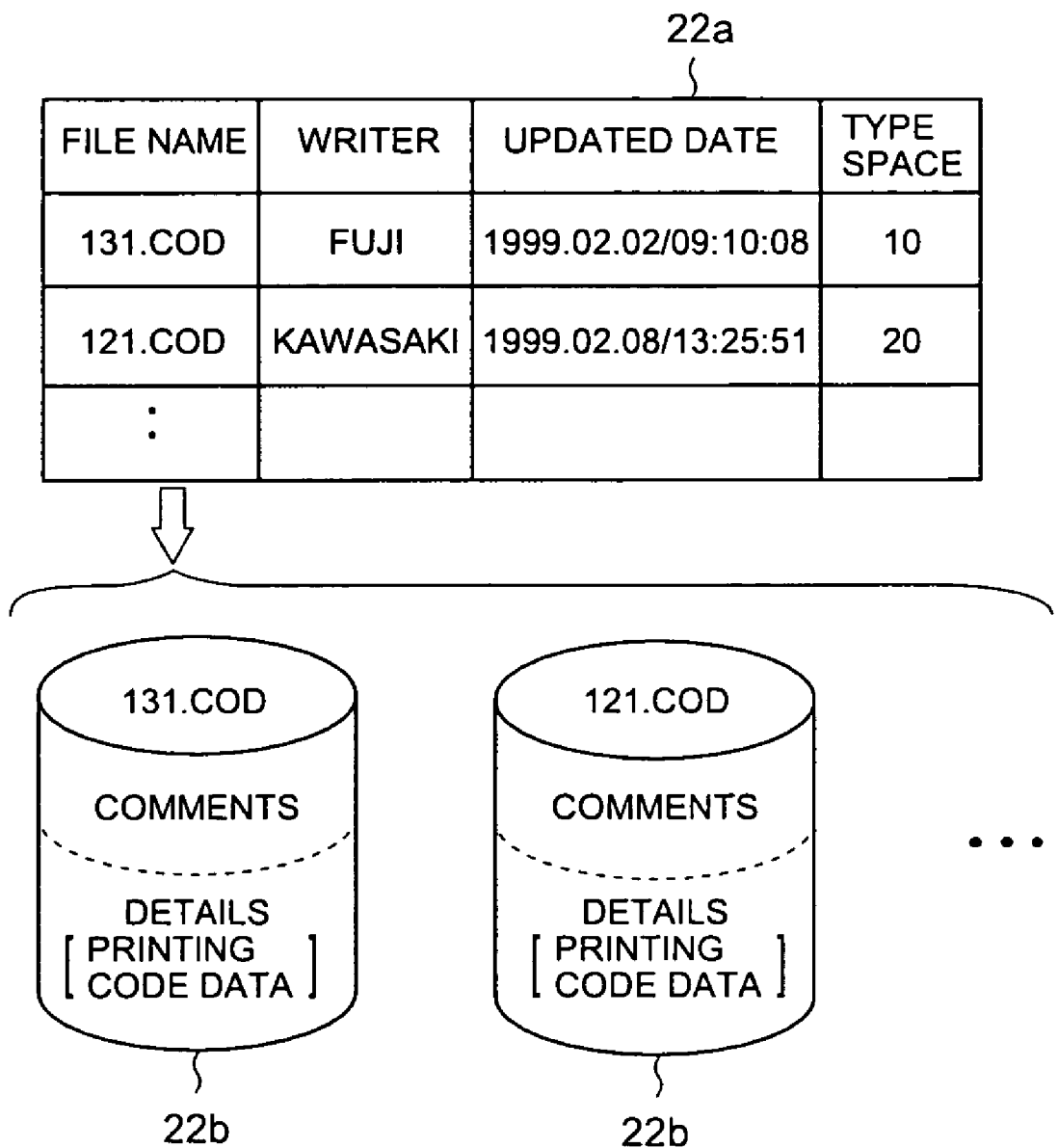
FIG. 7 shows the entire structure of an additional material management database and an additional material file.

In step S15, the edit mechanism 11 stores the information of the produced additional materials and printing code data obtained from the additional material information in an additional material management database 22a (shown in FIG. 7). The operation then moves on to the next step. Prior to this storage, the type space required for printing the additional materials should be specified.

In step S16, the linking mechanism 13 stores link information of a direct-reading material designated by a user and the additional material related to the designated direct-reading material in a link management database 23 (shown in FIG. 9). The operation then moves on to the next step.

In step S17, the layout design mechanism 14 allocates the designated direct-reading material and the related additional material onto paper, and the operation then moves on to the next step.

In step S18, it is determined whether or not the layout of the direct-reading material has been completed, i.e., whether or not an instruction to stop the layout has been issued from a user. If it is determined that the layout of the direct-reading material has been completed, the operation moves on to the next step. If it is determined that the layout of the designated direct-reading material has not been completed, the operation returns to step S17.

Figure 17:
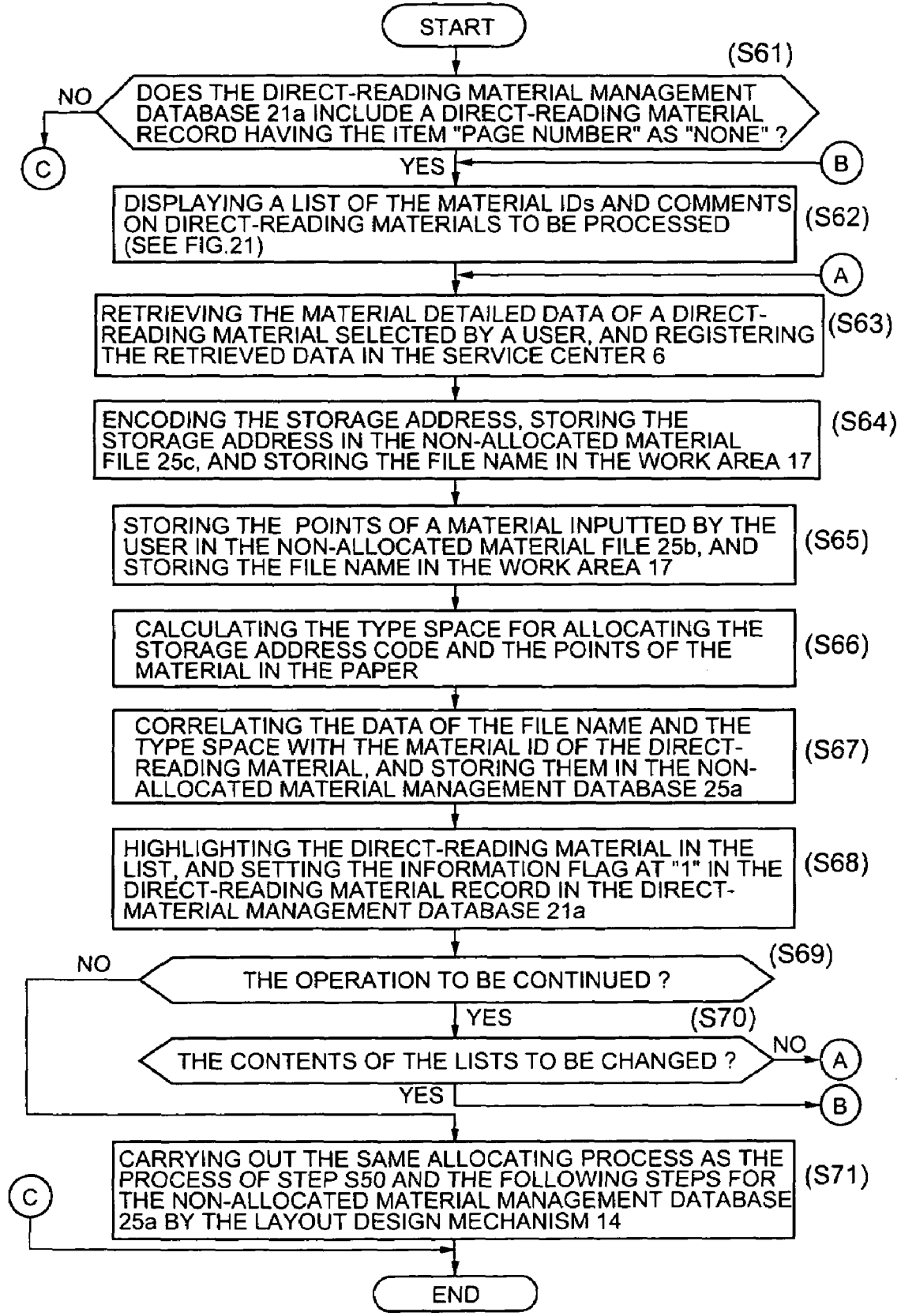
FIG. 17 is a flowchart of an operation of the information creating mechanism for non-allocated materials in accordance with the present invention.

In step S19, the information creating mechanism 15 stores a non-allocated direct-reading material designated by a user in the service center 6, and also stores service material information including printing code data of the storage address (a storage address code) the points of a material produced by the user in a non-allocated material management database 25*a* (shown in FIG. 17). The operation then moves on to the next step. Prior to the storage, the type space required for printing the service materials (including the points of the material and the storage address code) is specified.

In step S20, the information creating mechanism 15 determines whether all the service materials to be placed in the newspaper have been produced, i.e., whether an instruction to stop the production has been issued from the user. If the information creating mechanism 15 determines that all the service materials have been completed, the operation moves on to the next step. If the information creating mechanism 15 determines that not all the service materials have been completed, the operation returns to step S19.

In step S21, the layout design mechanism 14 allocates each of the service materials onto the paper (see FIG. 17), and the operation then moves on to the next step. Here, the user may designate the service materials one by one, or a layout determining mechanism may be employed to allocate the service materials in a predetermined order.

In step S22, the printing device 5 carried out trial printing and actual printing, and the operation comes to an end. This printing process is performed on the data stored in a direct-reading file 21*b* and an additional material file 22*b* described later.

For a text material, the type space is calculated from data including character size, the number of characters, character pitch, the number of lines, line pitch, the number of columns, and column pitch.

For a photograph or picture material or a printing code material, the type space is calculated from data including the number of pixels (the number of dots) in the transverse direction, and the output resolution of the printing device (the number of dots to be printed per inch). Since a printing code material is processed as image data, the type space is determined by the number of pixels and the like.

The user may specify the length and width of the type space.

Figure 6:
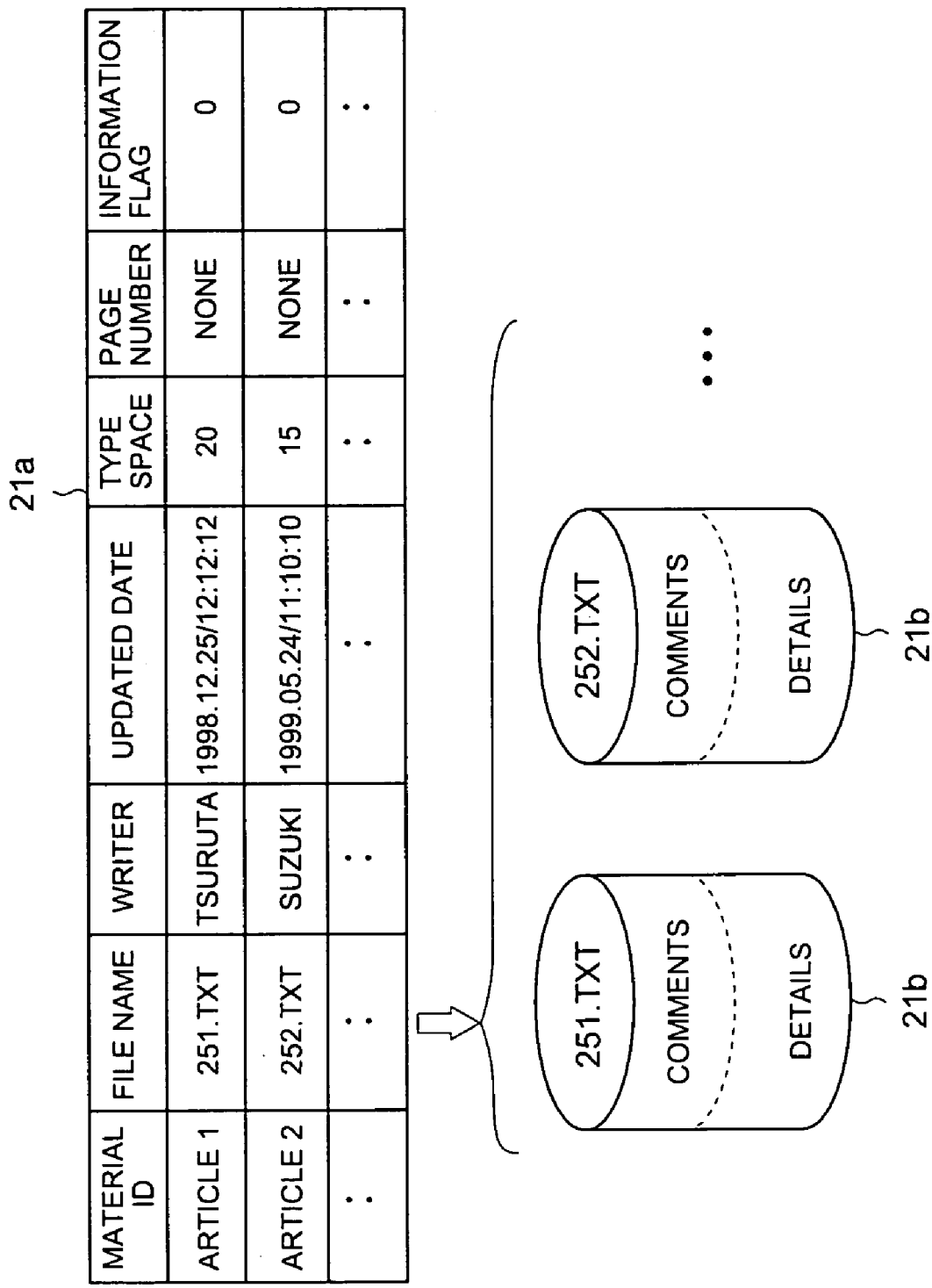
FIG. 6 shows the entire structure of a direct-reading material-management database and a direct-reading material file.

FIG. 6 shows the structure of the direct-reading material management database and the direct-reading material file. Each direct-reading record of the direct-reading material management database 21*a* comprises: the material ID of a direct-reading material; the file name of the direct-reading material file 21*b* that stores the direct-reading material (both the comment on the material and the details of the material); the name of the writer of the direct-reading material; the updated date: the type space of the direct-reading material; the page number; and an information flag to indicate the direct-reading material should be placed as a service material in the newspaper.

FIG. 7 shows the structure of the additional material management data base and the additional material file. Each additional material record in the additional material management database 22*a* comprises: the name of the additional material file 22*b* that stores the corresponding additional material (both the comment on the material and the details of the material); the name of the writer of the additional material; the updated data; the type space of the additional material.

A user can access any material file by referring to the management databases of FIGS. 6 and 7 for the file name. The type space is normally represented by a numeric value. When the comment on the material is not printed, the type space is calculated only from the details of the material.

Figure 8:
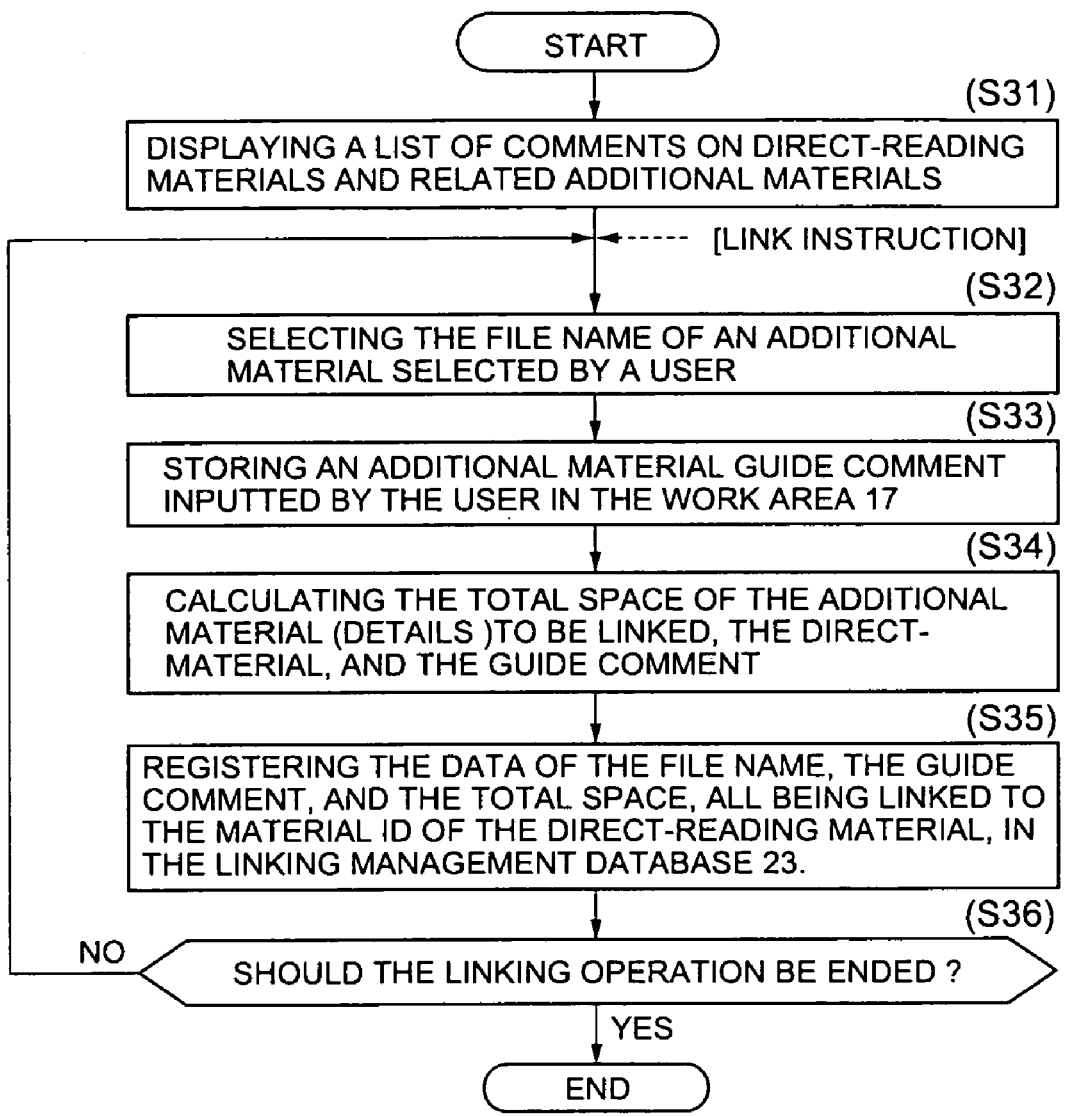
FIG. 8 is a flowchart of an operation of a linking mechanism in accordance with the present invention.

FIG. 8 is a flowchart of the operation of the linking mechanism, the contents of which are as follows. Prior to the linking operation, the direct-reading management database 21*a*, the direct-reading material file 21*b*, the additional material management database 22*a*, and the additional material file 22*b*, are stored in the internal memory 16.

In step S31, the respective comments on direct-reading materials and additional materials are displayed as a list on the display device 4, and the operation then moves on to the next step.

In step S32, a user selects the name of an additional material file to be linked, and the operation then moves on to the next step.

In step S33, the guide comments (including which direct-reading material is linked to the additional material and the scanning direction of the additional material) on the additional material selected by the user is stored in the work area 17. The operation then moves on to the next step.

In step S34, the total space is determined for the additional material (the details of the material) to be linked, the linked direct-reading material, and the guide comments. The operation then moves on to the next step. This calculation is based on the type space of the direct-reading material record and the additional material record, and the type space of the guide comments. The type space of the guide comments can be calculated in the same manner as described before for a text material.

In step S35, the above data including the file name, the guide comments, and the total space is correlated with the material ID of the linked direct-reading material, and is then registered in the linking management database 23. The operation then moves on to the next step.

In step S36, it is determined whether or not the linking operation should be stopped, i.e., whether or not an instruction to stop the linking operation has been issued from the user. If it is determined that the linking operation should be stopped, the operation comes to an end. If it is determined that the linking operation should not be stopped, the operation returns to step S32.

Whether the linking operation is carried out for each additional material or a plurality (or all) of additional materials is left to the user's discretion.

FIG. 9 shows the structure of the linking management database. Each linking record in the linking management database 23 comprises: the material ID of a direct-reading material; the name of the file that stores the related additional material; the guide comments on the additional material; and the total space of the three elements consisting of the direct-reading material, the additional material, and the guide comments.

As can be seen in the linking management database 23 shown in FIG. 9, the linking mechanism 13 can link a plurality of additional materials to one direct-reading material.

Figure 10:
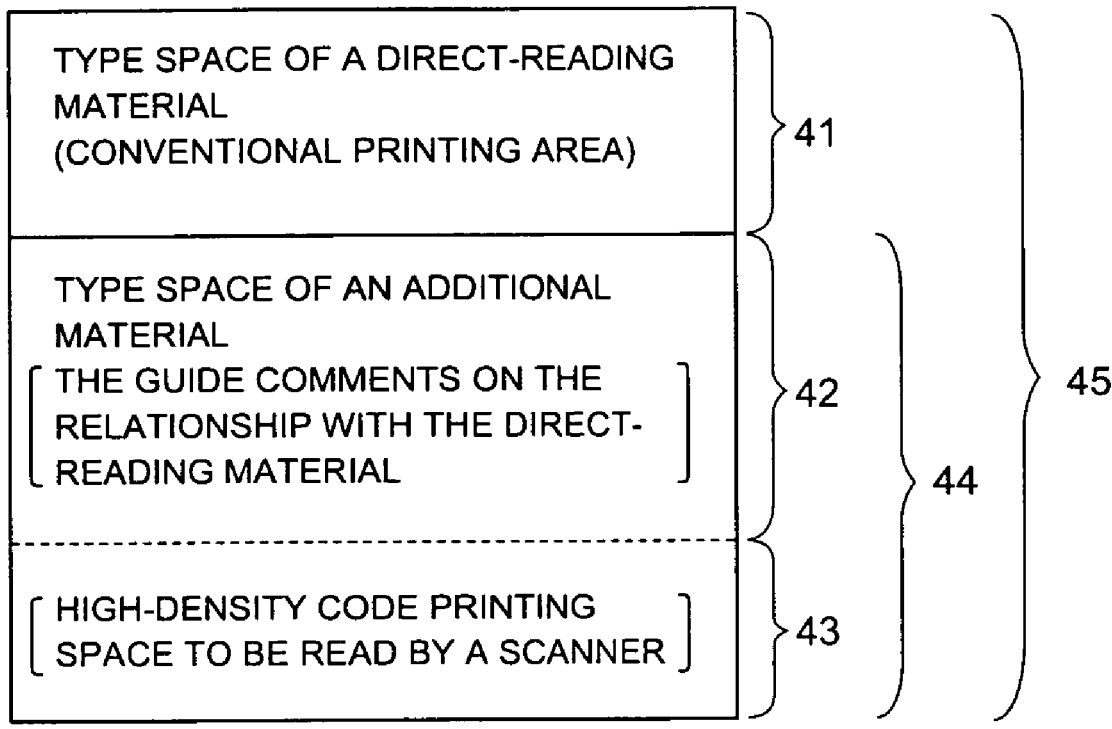
FIG. 10 shows the relationship between a direct-reading material and the allocated spaces of the related additional material.

FIG. 10 illustrates the relationship between a direct-reading material and the allocated space of the related additional material. In FIG. 10, reference numeral 41 indicates the type space of the direct-reading material (see FIG. 6). Reference numeral 42 indicates the type space of the guide comments on the additional material. Reference numeral 43 indicates the type space of the code portion of the additional material (see FIG. 7). Reference numeral 44 indicates the entire type space of the additional material. Reference numeral 45 indicates the total type space of the direct-reading material and the additional material (see FIG. 9).

The direct-reading printing is performed in the spaces on the paper corresponding to the type spaces 41 and 42, while the code printing (indirect-reading printing) is performed in the space on the paper corresponding to the type space 43. The code printed portion is read by a scanner.

FIGS. 11A to 11D illustrate example positions of allocated additional materials in accordance with the present invention. More specifically, FIG. 11A shows a case where an additional material 52 is allocated immediately after the allocation of a direct-reading material 51. This allocated position of an additional material will be hereinafter referred to as "immediate allocation position". FIG. 11B shows a case where the additional material 52 is allocated in one of special spaces that are set in advance for additional materials. This allocated position of an additional material will be hereinafter referred to as the "special position". FIG. 11C shows a case where the additional material 52 is allocated in a non-allocated area designated by the user. This allocated position of an additional material will be hereinafter referred to as the "directly designated vacant position". FIG. 11D shows a case where the additional material 52 is allocated within an allocated area designated by the user. This allocated position of an additional material will be hereinafter referred to as the "directly designated overlapping position".

In FIG. 11C, the additional material 52 is allocated in a non-allocated area situated at a distance from the related direct-reading material 51. In FIG. 11D, the additional material 52 is allocated in a part of the area in which an advertisement material has been placed.

FIG. 12 is a flowchart of an operation of the layout design mechanism. Prior to this layout design operation (or allocating operation), the direct-reading material management database 21a, the direct-reading material file 21b, the additional material management database 22a, and the linking management database 23, are stored in the internal memory 16.

In step S41, initial setting is carried out for the paper space management database 24. The contents of the initial setting are stored in the internal memory 16, and the operation then moves on to the next step.

In step S42, a paper space record of a page designated by the user is retrieved from the paper space management database 24, and the operation then moves on to the next step.

In step S43, it is determined whether or not the entire space of the designated page is larger than its already used space. If it is determined that the entire space of the designated page is larger than its already used space, the operation moves on to the next step. If it is determined that the entire space of the designated page is not larger than its already used space, the operation moves on to step S45.

In step S44, it is determined whether or not the direct-reading material management database 21a includes a direct-reading material record having the item "page number" as "none". If the direct-reading material management database 21a includes a direct-reading material record having the item "page number" as "none", the operation moves on to step S46. If the direct-reading material management database 21a does not include such a direct-reading material record, the allocating operation comes to an end.

In step S45, it is determined whether or not the allocating operation should be stopped, i.e., whether or not an instruction to stop the allocating operation has been issued from the user. If it is determined that the allocating operation should be stopped, the allocating operation comes to an end. If it is determined that the allocating operation should be not be stopped, the operation returns to step S42.

In step S46, the material ID of a direct-reading material to be allocated in the present operation and the comments on the material are displayed as a list on the screen of the display material 4. Here, the user can set the range of the list on the screen (see FIG. 19). The operation then moves on to the next step.

In step S47, it is determined whether or not there is an additional material linked to the direct-reading material selected by the user, in accordance with the linking management database 23. If there is an additional material linked to the direct-reading material selected by the user, the operation moves on to the next step. If there is no additional material linked to the direct-reading material selected by the user, the operation moves on to step S50.

In step S48, it is determined whether or not there is enough space left on the designated page for the direct-reading material and the additional material linked to the direct-reading material (see FIG. 14). If there is enough space left on the designated page, the operation moves on to the next step. If there is not enough space left, the operation moves on to step S56.

In step S49, the linked direct-reading material and additional material are allocated on the designated page (see FIG. 15). The operation then moves on to step S52.

In step S50, it is determined whether or not the entire space of the designated page is larger than the total of the used space and the type space of the direct-reading material record. If the entire space of the designated page is larger than the total of the used space and the type space of the direct-reading material record, the operation moves on to the next step. If the entire space of the designated page is not larger than the total of the used space and the type space of the direct-reading material record, the operation moves on to step S56.

In step S51, the direct-reading material is allocated on the designated page, and the operation moves on to the next step.

In step S52, it is determined whether or not the result of the allocation of the direct-reading material is allowable ("OK"). If it is determined that the result of the allocation of the direct-reading material is OK, the operation moves on to the next step. If it is determined that the result of the allocation of the direct-reading material is not allowable, the operation moves on to step S55. It is the user who decides whether or not the result of the allocation of the direct-reading material is allowable.

Figure 16:
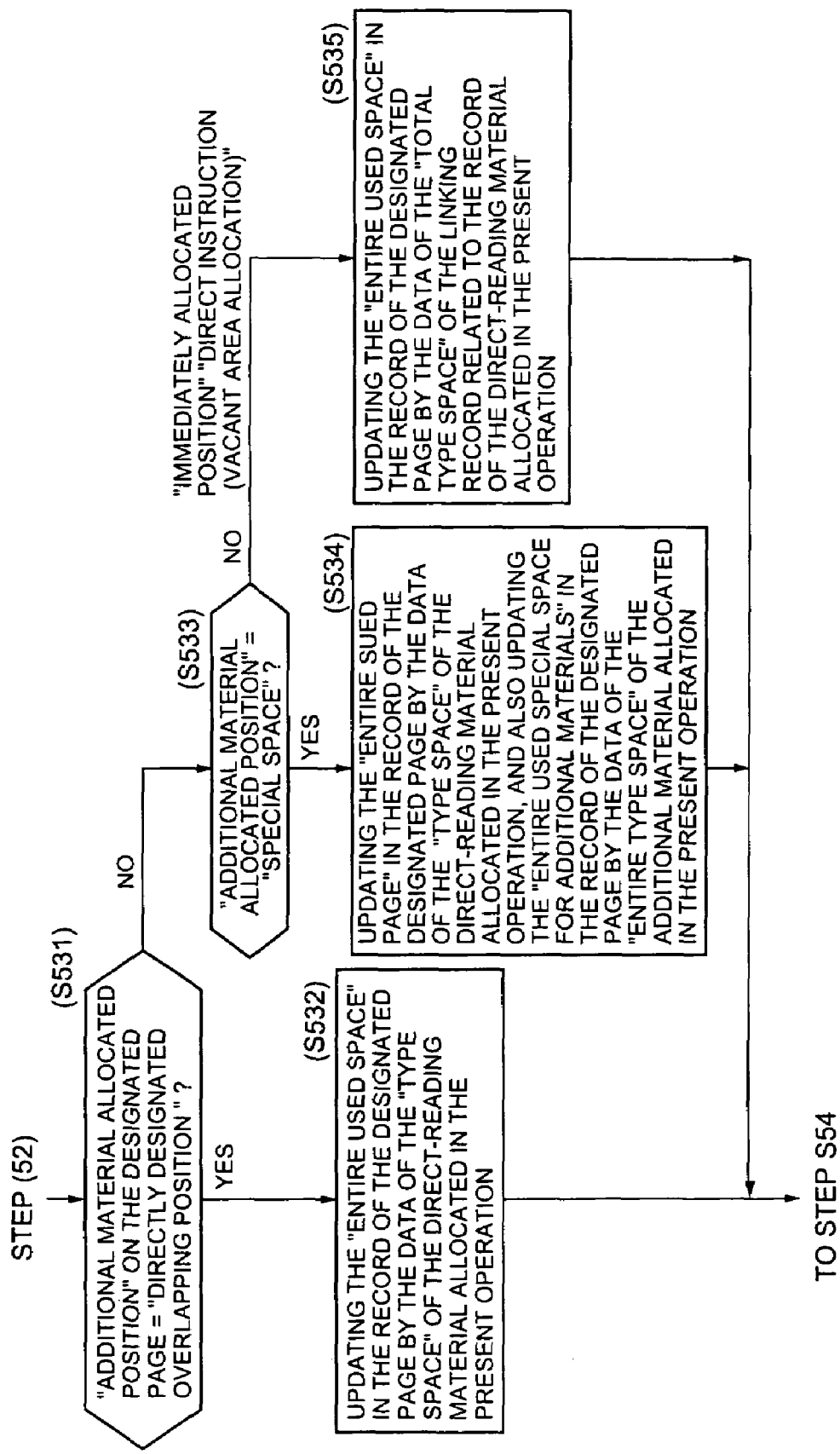
FIG. 16 shows the detailed contents of step S53 in the flowchart of FIG. 12.

In step S53, the type space used in the allocating operation is registered in the page space management database 24 (see FIG. 16). The operation then moves on to the next step.

In step S54, the item "page number" in the direct-reading material record is updated with the value of the designated page number. The operation then moves on to step S56.

In step S55, the contents of the completed allocating operation are erased, and the operation moves on to the next step.

In step S56, it is determined whether or not the allocating operation should be stopped, i.e., whether or not an instruction to stop the allocating operation has been issued from the user. If it is determined that the allocating operation should be stopped, the allocating operation comes to an end. If it is determined that the allocating operation should not be stopped, the allocating operation moves on to the next step.

In step S57, it is determined whether or not the allocating operation should be continued on the same designate page. If an instruction to continue the allocating operation on the same designated page is issued, the operation returns to step S43. If an instruction to perform the allocating operation on a different page is issued, the operation returns to step S42.

FIG. 13 shows an example of the initial setting of the page space management database. Each page space record in the page space management database comprises: page number (in a newspaper); the total space of the page; existence of any special space for additional materials; the entire special space for additional materials; the total of used special space for additional materials; the total of the used space on the page; and the additional material allocated position (see FIGS. 11A to 11D).

If "the entire special space for additional materials", the value of the special areas for the additional materials shown in FIG. 11B is registered in the initial setting stage for the page space management database 24. This value is also registered in "the total of the used space on the page"

The allocation in the special areas for additional materials is carried out within "the entire special space for additional materials". Accordingly, the value of "the total of the used space on the page" is not changed by allocation of additional materials in the special areas for additional materials. On the other hand, the value of "the total of used special space for additional materials" is of course changed by allocation of additional materials.

The type space used in the page space management database 24 is calculated from data including basic character size, the number of characters, character pitch, the number of lines, line pitch, the number of columns, and column pitch. The user may specify the length and width of the type space.

FIG. 14 is a table of the criteria used in step S48 in the flowchart of FIG. 12. The contents of the criteria vary with the allocated position of an additional material (see FIGS. 11A to 11*d*).

(A) When the allocated position is the "immediate allocation position", the entire space of the designated page should be larger than the sum of the entire used space and the total type space 45 of the direct-reading material and the additional material to be allocated in the present operation.

(B) When the allocated position is in the "special space", the entire space of the designated page should be larger than the sum of the entire used space and the type space 41 of the direct-reading material to be allocated in the present operation, and the entire special space for additional materials should be larger than the sum of the entire used special space for additional materials and the type space of the additional material to be allocated in the present operation (i.e., the total type space 45 of the linking management database—the type space 41 of the direct-reading material).

(C) When the allocated position is the "directly designated vacant position", the entire space of the designated page should be larger than the sum of the entire used space and the total type space 45 of the direct-reading material and the additional material to be allocated in the present operation.

This criterion is the same as in the case (A).

(D) When the allocated position is the "directly designated overlapping position", the entire space of the designated page should be larger than the sum of the entire used space and the type space 41 of the direct-reading material to be allocated in the present operation.

FIG. 15 is a flowchart of step S49 in the flowchart of FIG. 12, the detailed contents of which are as follows.

In step S491, the direct-reading material selected by the user is allocated in a non-allocated area (except the special space for additional materials) on the designated page. The operation then moves on to the next step.

In step S492, it is determined whether or not the "additional material allocated position" in the record of the designated page in the page space management database 24 is the "immediate allocation position". If the "additional material allocated position" is the "immediate allocation position", the operation moves on to the next step. If the "additional material allocated position" is not the "immediate allocation position", the operation moves on to step S494.

In step S493, the additional material detected in step S47 is allocated in a position that continues from the direct-reading material allocated position. The operation then moves on to step S50 in the flowchart of FIG. 12.

In step S494, it is determined whether or not the "additional material allocated position" in the designated page record indicates the "special space". If the "additional material allocated position" indicates the "special space", the operation moves onto the next step. If the "additional material allocated position" does not indicate the "special space", the operation moves on to step S496.

In step S495, the additional material detected in step S47 is allocated in the special area for additional materials, and the operation then moves on to step S50 in the flowchart of FIG>12.

In step S496, it is determined whether or not the "additional material allocated position" in the designated page record is the "directly designated vacant position". If the "additional material allocated position" is the "directly designated vacant position", the operation moves on to the next step. If the "additional material allocated position" is not the "directly designated position "vacant space)", the operation moves on to step S498.

In step S497, non-allocated areas (except the special areas for additional materials) are displayed on the display device 4, and the additional material detected in step S47 is allocated in a position among the non-allocated areas designated by the user. The operation then moves on to step S50 in the flowchart of FIG. 12.

In step S498, allocated advertisement areas are displayed on the display device 4, and the additional material detected in step S47 is allocated in a position among the allocated advertisement areas designated by the user. The operation then moves on to step S50 in the flowchart of FIG. 12.

Prior to the above allocating operation, the layout design mechanism 14 obtains layout information.

If it is determined in step S496 that the additional material allocated position is neither the "directly designated vacant position" nor the "directly designated overlapping position", the user is informed of that result and issues a further instruction.

If the allocated area of the additional material is larger than the allocated advertisement area, the user is notified of the fact and issues a further instruction. By doing so, the text can be prevented from being eliminated by the additional material.

FIG. 16 shows the detailed contents of step S53 in the flowchart of FIG. 12.

In step S531, it is determined whether or not the "additional material allocated position" in the record of the designated page in the page space management database 24 is the "directly designated overlapping position". If it is determined that the "additional material allocated position" in the record of the designated page is the "directly designated overlapping position", the operation moves on to the next step. If it is determined that the "additional material allocated position" is not the "directly designated overlapping position", the operation moves on to step S533.

In step S532, the item "the entire used space" in the record of the designated page is updated by the data of the type space 41 of the direct-reading material allocated in the present operation. The operation then moves on to step S54 in the flowchart of FIG. 12.

In step S533, it is determined whether or not the "additional material allocated position" in the record of the designated page indicates the "special space". If it is determined that the "additional material allocated position" indicates the "special space", the operation moves on to the next step. If it is determined that the "additional material allocated position" does not indicate the "special space", the operation moves on to step S535.

In step S534, the "entire used space" in the record of the designated page is updated by the data of the "type space 41" of the direct-reading material allocated in the present operation, and the "entire used special space for additional materials" in the record of the designated page is updated by the data of the "entire type space 44 (see FIG. 10)" of the additional material allocated in the present operation. The operation then moves on to step S54 in the flowchart of FIG. 12.

In step S535, the "entire used space" in the record of the designated page is updated by the data of the "total type space 45" of the linking record related to the record of the direct-reading material allocated in the present operation. The operation then moves on to step S54 in the flowchart of FIG. 12.

The entire type space 44 of the additional material in step S534 is calculated by subtracting the "type space 41" of the direct-reading material from the "total type space 45" of the linking record.

In step S53, a direct-reading material moved from step S47 through step S50 is processed only in step S532 in FIG. 16.

If the "additional material allocated position" is neither the "immediate allocation position" nor the "directly designated vacant position", the user is notified of the fact through the display, and issues a further instruction.

FIG. 17 is a flowchart of an operation of the information creating mechanism that includes an information creating program for non-allocated materials (see FIG. 4). Prior to this information creating operation, the direct-reading management database 21*a* and the direct-reading file 21*b* are stored in the internal memory 16.

In step S61, it is determined whether or not the direct-reading material management database 21*a* includes one or more direct-reading material records having the item "page number" as "none". If it is determined that the direct-reading material management database 21*a* includes one or more direct-reading material record having the item "page number" as "none", the operation moves on to the next step. If the direct-reading material management database 21*a* includes no direct-reading material record having the item "page number" as "none", this information creating operation for non-allocated materials comes to an end.

In step S62, the material ID and the comments on a direct-reading material to be processed in this information creating operation are displayed as a list on the display device 4 (see FIG. 21). The operation then moves on to the next step. Only direct-reading material records having the item "page number" as "none" are processed in this information creating operation. A user can selects one of such direct-reading material records displayed on the initial display shown in FIG. 21.

In step S63, the material detailed data of the direct-reading material selected by the user is retrieved from the displayed list and registered in the service center 6. The operation then moves on to the next step.

In step S64, the storage address in the service center 6 is coded and stored in a storage address code file (non-allocated material file) 25*c*. The file name of the storage address code file 25*c* is stored in the work area 17. The information creating mechanism 15 automatically sets the file name of the storage address code file 25*c* including the material ID, for instance.

In step S65, points of the direct-reading material inputted by the user are stored in a material point file (non-allocated material file) 25*b*, and the file name of the material point file 25*b* is stored in the work area 17. The information creating mechanism 15 automatically sets the file name of the material point file 25*b* including the material ID, for instance.

In step S66, the type space for placing the storage address code and the points of the material in the newspaper is calculated. The operation then moves on to the next step. The type space of the storage address code and the points of the material are calculated in the same manner as descried before.

Figure 18:
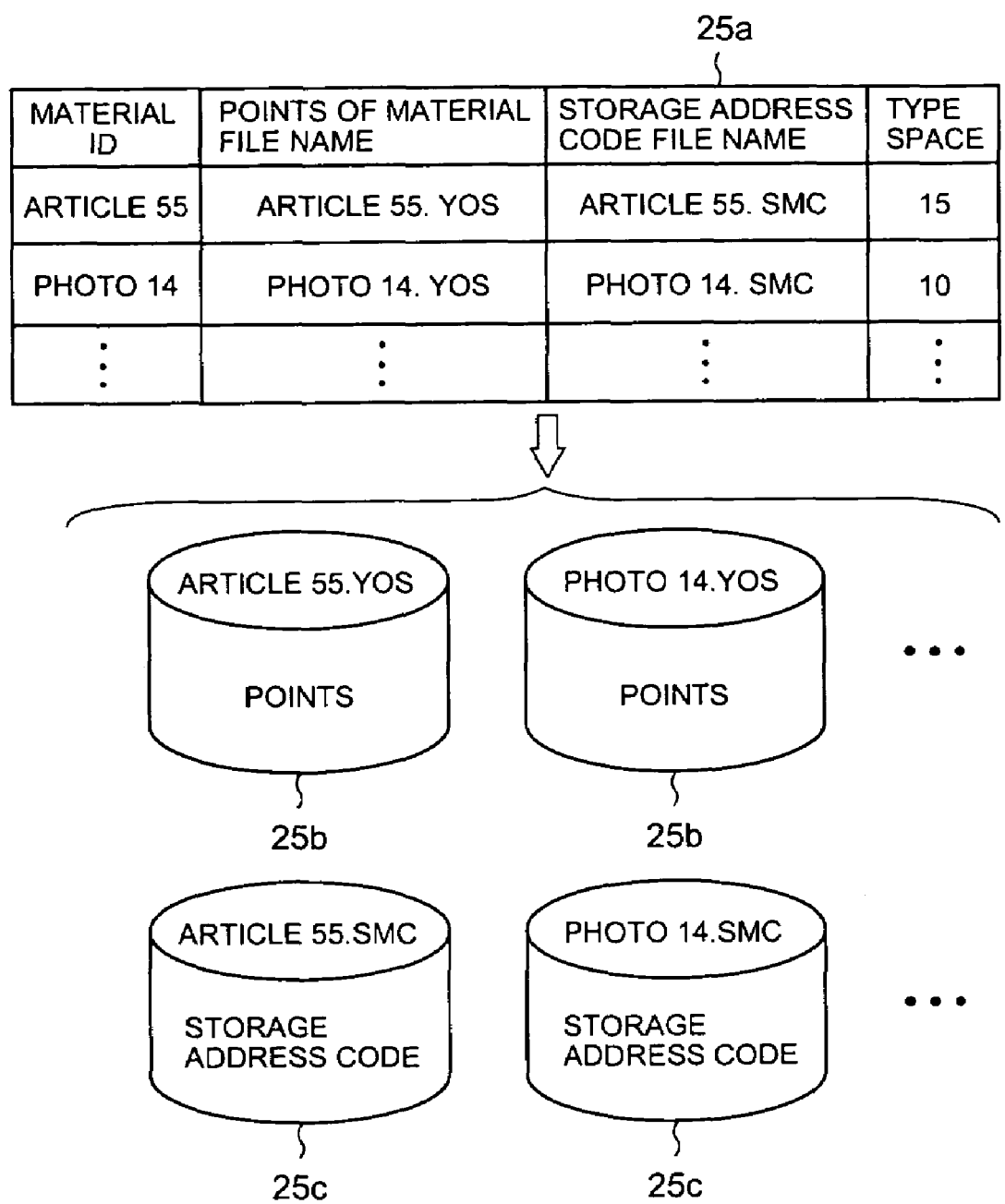
FIG. 18 shows a non-allocated material management database and the content of each non-allocated material record.

In step S67, the data of the file name and the type space are correlated with the material ID of the direct-reading material, and are stored in a non-allocated material management database 25*a* (see FIG. 18). The operation then moves on to the next step.

In step S68, the direct-reading material in the list is highlighted on the display, and an information creating operation completed flag is set at "1" in the direct-material record in the direct-material management database 21*a*. The operation then moves on to the next step.

In step S69, it is determined whether or not the information creating operation should be continued, i.e., whether or not an instruction to stop the information creating operation has been issued from the user. If it is determined that the information creating operation should be continued, the operation moves on to the next step. If it is determined that the information creating operation should not be continued, the operation moves on to step S71.

In step S70, it is determined whether or not the list on the display should be changed, i.e., whether or not an instruction to change the list has been issued from the user. If it is determined that the list should be changed, the operation returns to step S62. If it is that the list should not be changed, the operation returns to step S63.

In step S71, the same allocating process as the process of step S50 and the following steps in FIG. 12 is performed on the non-allocated material management database 25*a* by the layout design mechanism 14. In this allocating process, the "direct-reading material" in FIG. 12 should be replaced by the "non-allocated material". The information creating operation for non-allocated materials then comes to an end.

FIG. 18 shows the non-allocated material management database. Each non-allocated material record in the non-allocated material management database 25*a* comprises: the material ID of a direct-reading material; the file name of the material point file 25*b*; the file name of the storage address code file 25*c*; and the type space of the points of the material and the storage address code.

FIG. 19 shows the initial state of a material selecting display. This display is used in step S46 and step S47 in the flowchart of FIG. 12. A user can designate a type of a material (all, picture, text, or advertisement), an inplementor, an undated date, a type space, and a material ID. In accordance with the designated contents, the display device 4 displays a list of direct-reading materials that satisfy the designated conditions.

Figure 20:
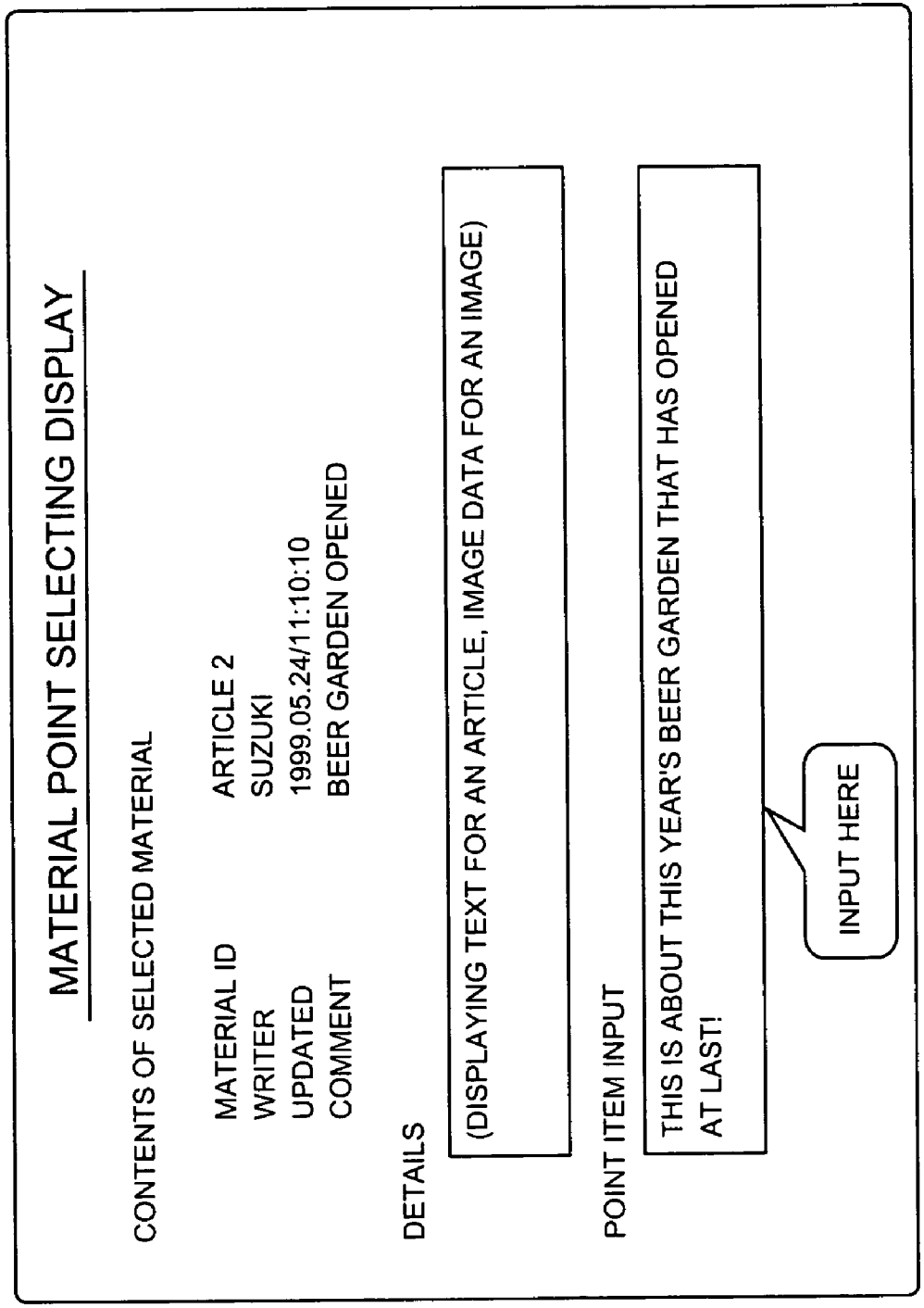
FIG. 20 shows an inputted state of a material point selecting display of FIG. 19.

FIG. 20 shows an inputted state of a material point selecting display. This material point selecting display comprises a point display portion and a point input display portion, and is used in the material point inputting process in step S65 in the flowchart of FIG. 17.

FIG. 21 shows the initial state of a non-allocated material selecting display. This display is used in step S62 for displaying a list of the material ID and comments on a direct-reading material to be processed in the information creating operation for non-allocated materials. The range of the display can be controlled by specifying the material selecting conditions in the same manner as in the initial state of the material selecting display of FIG. 19.

Figure 22:
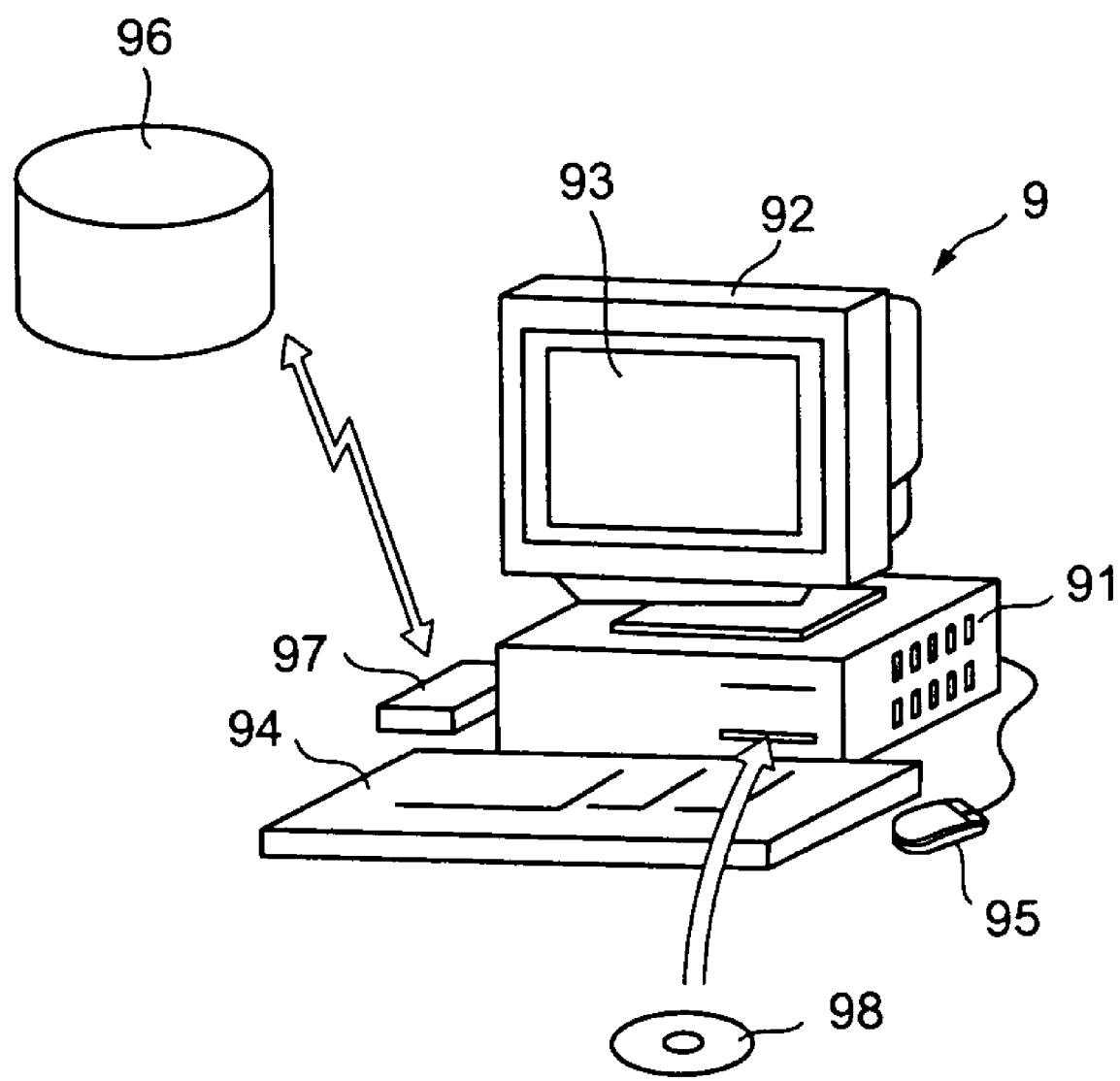
FIG. 22 is a schematic view of a computer system that reads a program from a computer-readable recording medium and executes the program.

FIG. 22 is a schematic view of a computer system that reads a program from a computer-readable recording medium and executes the program. In FIG. 22, reference numeral 9 indicates the computer system. Reference numeral 91 indicates a main device that houses the CPU, a disk drive, and the likes. Reference numeral 92 indicates a display unit that displays an image in compliance with an instruction from the main device 91. Reference numeral 93 indicates the screen of the display unit 92. Reference numeral 94 indicates a keyboard for inputting various kinds of information into the computer system 9. Reference numeral 95 indicates a mouse for designating a desired position on the screen 93. Reference numeral 96 indicates an external database (a memory such as a DASD). Reference numeral 97 indicates a modem for accessing the external database 96. Reference numeral 98 indicates a mobile recording medium such as a CD-ROM or floppy disk.

The recording medium that stores programs may be the external database 96 on the program provider side, the mobile recording medium 98, or a RAM or hard disk in the main device 91. Any of the programs can be loaded in the main device 91 and executed in the main memory.

The present invention is not limited to the specifically disclosed embodiments, but variations and modifications may be made without departing from the scope of the present invention.

The present application is based on Japanese priority application No. 11-156824, filed on Jun. 3, 1999, the entire contents of which are hereby incorporated by reference.

What is claimed is:

1. A method of producing printed matter containing a direct-reading material and an additional material related to the direct-reading material by an information processing apparatus, the direct-reading material comprising text and pictures, and the additional material comprising text, sound, and images related to the direct-reading material, the method comprising:

converting primary data of the additional material into secondary data in the form of codes for high-density display;

determining the additional material linked with the direct-reading material to allocate, with reference to a link management database storing a link between direct-reading material and additional material, wherein the allocation is carried out based on a total space for the direct-reading material and the additional material;

storing data to be applied to an allocating operation;

determining a specific way of allocating the additional material with respect to relevant direct-reading material based on the stored data; and performing the allocating operation for the direct-reading material and the additional material in accordance with a type space corresponding to the secondary data, wherein the primary data of the additional material converted into the secondary data in the form of codes for high-density display comprise data from which information content is obtained directly without accessing a separate storage location, and wherein the specific way of allocating the additional material with respect to the relevant direct-reading material is selected from among the following ways of allocating the additional material: allocating at an immediate position of the relevant direct-reading material, allocating at a special space, allocating at a directly designated vacant position, or allocating at a directly designated overlapping position.

2. The method as claimed in claim 1, wherein said performing an allocating operation comprises linking the direct-reading material designated by a user and the related additional material.

3. The method as claimed in claim 2, wherein said linking the direct-reading material and the related additional material uses an address of a separate storage location in which said related additional material is stored.

4. The method as claimed in claim 1, wherein the secondary data in the form of codes for high density display comprises two-dimensional barcode.

5. An apparatus that produces printed matter on which a direct-reading material comprising text and pictures, and a related additional material comprising text, sound, and images, are printed, the apparatus comprising:

an encoding mechanism converting primary data of the additional material into secondary data in the form of codes for high-density display;

a determining part configured to determine the additional material linked with the direct-reading material to allocate, with reference to a link management database storing a link between direct-reading material and additional material, wherein the allocation is carried out based on a total space for the direct-reading material and the additional material;

a database storing data to be applied to an allocating operation;

a determining part configured to determine a specific way of allocating the additional material with respect to relevant direct-reading material, based on the data stored in said database; and a layout design mechanism performing an allocating operation for the direct-reading material and an allocating operation for the additional material in accordance with a type space corresponding to the secondary data, wherein the primary data of the additional material converted into the secondary data in the form of codes for high-density display comprise data from which information content is obtained directly without accessing a separate storage location, and wherein the specific way of allocating the additional material with respect to the relevant direct-reading material is selected from among the following ways of allocating the additional material: allocating at an immediate position of the relevant direct-reading material, allocating at a special space, allocating at a directly designated vacant position, or allocating at a directly designated overlapping position.

6. The apparatus as claimed in claim 5, further comprising a linking mechanism linking the direct-reading material designated by a user and the related additional material.

7. The apparatus as claimed in claim 6, wherein said linking mechanism linking the direct-reading material and the related additional material uses an address of a separate storage location in which said related additional material is stored.

8. The apparatus as claimed in claim 5, wherein the secondary data in the form of codes for high density display comprises two-dimensional barcode.

9. A computer-readable recording medium storing a program that produces printed matter containing a direct-reading material and an additional material related to the direct-reading material, the direct-reading material comprising text and pictures, and the additional material comprising text, sound, and images related to the direct-reading material, the program controlling a computer and comprising a process of:

converting primary data of the additional material into secondary data in the form of codes for high-density display;

determining the additional material linked with the direct-reading material to allocate, with reference to a link management database storing a link between direct-reading material and additional material, wherein the allocation is carried out based on a total space for the direct-reading material and the additional material;

storing data to be applied to an allocation operation;

determining a specific way of allocating the additional material with respect to relevant direct-reading material based on the stored data; and allocating the direct-reading material and the additional material in accordance with a type space corresponding to the secondary data, wherein the primary data of the additional material converted into the secondary data in the form of codes for high-density display comprise data from which information content is obtained directly without accessing a separate storage location, and wherein the specific way of allocating the additional material with respect to the relevant direct-reading material is selected from among the following ways of allocating the additional material: allocating at an immediate position of the relevant direct-reading material, allocating at a special space, allocating at a directly designated vacant position, or allocating at a directly designated overlapping position.

10. The computer readable recording medium as claimed in claim 9, wherein the secondary data in the form of codes for high density display comprises two-dimensional barcode.

* * * * *